United States Patent [19]
Sakano et al.

[11] Patent Number: 6,091,911
[45] Date of Patent: Jul. 18, 2000

[54] MICROSCOPE PHOTOGRAPHING UNIT WITH BRIGHTNESS CONTROL FOR OBSERVATION OPTICAL SYSTEM

[75] Inventors: Hitoshi Sakano; Chikaya Iko, both of Yokohama; Jun Matsuno, Zushi; Tatsuro Otaki, Tokyo, all of Japan

[73] Assignee: Nikon Corporation, Tokyo, Japan

[21] Appl. No.: 08/917,331

[22] Filed: Aug. 25, 1997

[30] Foreign Application Priority Data

Aug. 30, 1996 [JP] Japan .................................. 8-248857
Aug. 30, 1996 [JP] Japan .................................. 8-248858
Oct. 8, 1996 [JP] Japan .................................. 8-266449

[51] Int. Cl.$^7$ .................................................. G02B 21/36
[52] U.S. Cl. .......................... 396/432; 396/51; 359/368; 348/79; 250/201.3
[58] Field of Search .................................. 396/429, 432, 396/51, 276; 359/363, 368, 369, 381, 385; 362/276; 348/79; 250/201.2, 201.3

[56] References Cited

U.S. PATENT DOCUMENTS 4,415,952  11/1983  Hattori et al. ............................ 362/32
5,331,368  7/1994  Oosawa et al. ...................... 396/276 X

*Primary Examiner*—Safet Metjahic
*Assistant Examiner*—J. K. Han
*Attorney, Agent, or Firm*—Vorys, Sater, Seymour and Pease LLP

[57] ABSTRACT

A photographing unit for a microscope has a photometric detector to measure brightness of light from a sample and includes a changing member which changes a brightness of light toward an observation system and a control unit which controls the light based on a detection output of the photometric detector. In addition, the changing member can be controlled based on the presence of an observer. A shielding member can be provided that automatically shields an optical path of the observation system. An illumination system for an index on a reticle can be provided so that the illumination of the reticle can be performed or extinguished at desired times. Additionally, the color of light with which the index is illuminated may be made distinguishable from the color of light from a sample, and the contrast of the index to the sample can be controlled.

12 Claims, 21 Drawing Sheets

| PRISM ON OPTICAL PATH \ POSITION SENSOR | SENSOR 15a | SENSOR 15b |
|---|---|---|
| 111a | ON | ON |
| 111b | ON | OFF |
| NOT EXIST | OFF | ON |

MICROSCOPE PHOTOGRAPHING UNIT WITH BRIGHTNESS CONTROL FOR OBSERVATION OPTICAL SYSTEM

This application claims the benefit of Japanese Applications No. 8-248857, No. 8-248858 and No. 8-266449 which are hereby incorporated by reference.

BACKGROUND OF THE INVENTION

1. Field of the Invention

This invention relates to a photographing unit for a microscope.

2. Related Background Art

FIG. 12 is a view for explaining optical paths of a microscopic unit which is provided with a conventional photographing unit for a microscope, while FIG. 13 is a view taken along the line XIII—XIII in FIG. 12.

A microscopic unit 100 is provided with an objective lens 101, a projection lens 102, a photographing unit 110 for a microscope, and a camera 130.

The camera 130 is mounted on the photographing unit 110 for a microscope, in which a film 131 is loaded.

The photographing unit 110 is provided with prism 111 which divides light from a sample 103, which is guided by the objective lens 101, into an optical path A of a photographing system, an optical path B of an observation system and an optical path C of a photometric system.

A shutter 112 is disposed between the camera 130 on the optical path A of the photographing system and the prism 111. This shutter 112 controls an exposure time onto the film 131 of an image of the sample 103 which is formed on a primary image plane 101a of the objective lens 101 and enlarged by the projection lens 102.

On the optical path B of the observation system there are provided a reduction lens 114 which incorporates an angle of view of the film 131 into the field of view of a viewfinder eyepiece 113, and a reticle 115 which has double cross lines serving as an index for a photographing range frame or a focusing operation. The viewfinder eyepiece 113 is used to observe the reticle 115 and an image 115a formed on the reticle 115.

On the optical path C of the photometric system there is provided a photometric detector 123 which measures the brightness of the image from the sample 103.

An operation of the above-mentioned photographing unit for a microscope will be described below.

The prism 111 is located at a-1 position in FIG. 13 at a time other than the time of exposure. A light reflected on an optical path dividing plane RF1 is guided to the viewfinder optical path B, and the light passing through this optical path dividing plane RF1 is reflected on an optical path dividing plane RF2 and is guided to the optical path C of the photometric system.

A photographer adjusts the position of the eyepiece 113 in the direction of the optical axis with respect to the reticle 115 in accordance with a diopter, adjusts the focus on the double cross lines on the reticle 115, and at the same time, moves a stage 104 on which the sample 103 is mounted in the direction of the optical axis so that the double cross lines of the reticle 115 and the image of the sample 103 can be seen clearly.

In the photographing unit 110 for a microscope, an amount of the light which is guided by RF2 to the optical path C of the photometric system is measured by the photometric detector 123, and an exposure time is calculated from this measured value, and a film sensitivity and an exposure correction value which are previously determined.

During exposure, the prism 111 is moved from the position on the solid line in FIG. 13 to the a-2 position shown as the double-dotted line, as indicated by the arrow a, so as to be removed from the optical path B of the observation system and the optical path C of the photometric system. Thus, all of the light from the sample 103 is guided to the optical path A of the photographing system. Then, the shutter 112 is opened only for the exposure time which is determined by the arithmetic calculation, so that the image is projected to the film 131.

Since the photographing for a microscope is usually conducted by enlarging a small portion, it is susceptible to vibration. As a result, an obtained photograph may be blurred in some cases due to an instantaneous vibration which is caused when the shutter 112 inside the photographing unit 110 is actuated. In order to avoid the influence of this vibration, the illumination light onto the sample 103 may be darkened, so that, out of the overall exposure time, a time period after the mitigation of the vibration is prolonged as compared with a time period in which the operation is under the influence of the initial vibration.

However, when the exposure time is too long, the obtained photograph tends to be underexposed owing to the reciprocity law failure characteristic of the film 131 or to lack a color balance. In such cases, it is necessary to make exposure correction, dispose a filter for color correction in an illumination optical path of the microscope, or take some other counter steps. It is also necessary to retake photographs several times or take a lot of photographs under different conditions, in order to determine appropriate exposure correction or color correction.

Accordingly, in photographing for a microscope, when the exposure time is too short, the photographing is susceptible to vibration. On the other hand, if the exposure time is too long, an obtained photograph is underexposed or lacks a color balance. As a result, in order to obtain an excellent photograph it is necessary to set such exposure time which can avoid the influence of the vibration of the shutter 112 or the reciprocity law failure characteristic of the film 131.

However, in the conventional photographing unit 110 for a microscope, even when an appropriate value as can avoid the influence of the vibration of the shutter 112 or the reciprocity law failure characteristic of the film 131 is set for the exposure time, if a ratio of division of the prism 111 toward the optical path B of the observation system is set to be small, an image of a viewfinder VF is dark when the sample 103 is dark. On the other hand, if the ratio of division of the prism 111 toward the optical path B of the observation system is set to be large, the image of the viewfinder VF is too bright so as to be dazzling when the sample 103 is bright.

When the film 131 to be used is of high sensitivity, the exposure time is appropriate with a dark photographed image so that an image of the viewfinder VF at that time becomes dark. When the film 131 to be used is of low sensitivity, since the exposure time does not become appropriate unless a photographed image is bright, the image of the viewfinder VF becomes too bright so as to be dazzling.

Microscope manufacturers have set a ratio of division of the prism 111 in such a manner that an image of the viewfinder VF has reasonable brightness when the exposure time is set to be proper based on a film sensitivity which is most frequently used in general.

However, since a ratio of sensitivity of a low sensitivity film to a high sensitivity film comes to one to several hundreds, if the microscope makers use a film 131 having a sensitivity widely different from the film sensitivity used for determining the ratio of division of the prism 111, the image of the viewfinder VF may be too bright or too dark even when a proper value is set for the exposure time. Thus, the image becomes difficult to observe for the photographer.

For this reason, it is required for the photographer to first adjust an illumination light of the microscope, confirm a photographing range, and conduct focusing for the purpose of obtaining a proper light amount for the viewfinder VF, then to adjust an amount of the illumination light of the microscope for the second time for the purpose of obtaining a proper value for the exposure time. These procedures are troublesome for the photographer.

When light from the sample 103 is weak and it is bright outside the microscope, an amount of a light intruding from the optical path B of the observation system is relatively larger than an amount of the light from the sample 103, so that the photometric detector 123 can no longer conduct a correct photometric operation of the sample 103. As a result, when a photograph is taken with an exposure time which is calculated based on this photometric value, the obtained photograph is often underexposed.

Then, when a correct exposure is required, a cap (not shown) serving as a light-shielding member is put on the tip end of the viewfinder VF to prevent external intrusion of light into the microscopic unit 100, and photometry and exposure are conducted in this state.

However, since an operation for setting the photographing range or focusing is usually conducted for each frame of the film, it is necessary, but troublesome, to attach and remove the cap for each frame. In order to avoid this troublesome operation, a dedicated driving mechanism may be arranged for inserting or retracting the light-shielding member into or from an optical path. However, this brings about a problem that the microscopic unit 100 becomes expensive.

Moreover, since the light from the sample 103 is divided by the prism 111 into the viewfinder VF and the photometric detector 123, an amount of the light to be guided to the photometric detector 123 is less than that of the light to be guided to the film 131 during exposure. Accordingly, when the sample 103 is dark, an amount of the light to be guided to the photometric detector 123 sometimes does not reach the minimum light amount required for satisfying a photometric performance of the photometric detector 123, so that photometry with high reliability can not be conducted.

Further, in the conventional photographing unit for a microscope, when the sample image to be photographed is dark, an index of a reticle which is provided in a viewfinder portion is difficult to be recognized. Therefore, there is known a device for making the index portion more visible by illuminating the reticle. As such device for illuminating the reticle in the conventional photographing unit for a microscope, there is a device which is provided with a plurality of light sources for emitting lights of different colors so as to select any color for illumination, or a device in which an ON/OFF operation for illumination can be arbitrarily conducted by an observer of the microscope.

However, the reticle has to be illuminated by the observer properly, and the reticle illumination tends to be forgotten as lighted or extinguished when samples or observing conditions are changed over. In addition, there are cases in which the illumination light for illuminating the reticle becomes a stray Light when a dark object is photographed with automatic exposure, to effect a photometric detector for measuring a light from the sample, thereby rendering an inappropriate exposure, and in which when a bright object is photographed with automatic exposure, if the reticle illumination is unnecessarily bright, a photometric range index can not be aligned with the target so as to generate an error in the exposure time, thereby rendering an inappropriate exposure. Therefore, an operation for off the illumination of the reticle is required at the photographing time, which is troublesome. Moreover, in order to confirm the index provided on the reticle together with the sample image, it is required to illuminate the reticle with a color different from that of the light from the sample, and an operation for changing over illumination light sources for the light emission is also troublesome.

SUMMARY OF THE INVENTION

The present invention was conceived taking the above-mentioned circumstances into consideration, and an object of the invention is to provide a photographing unit for a microscope which can make an exposure time to be proper and which can conduct a viewfinder observation with a proper amount of light.

A photographing unit of the present invention is provided with a photometric member which measures a brightness of a light from a sample, changing member which changes a brightness of light from the sample toward an observation system, and a control unit which controls the brightness of the light from the sample toward the observation system by the changing member based on a detection output of the photometric member.

Since the control unit controls the brightness of the light to the observation system by the changing member based on the output of the photometric detector, an amount of light to be divided to the optical path of the observation system can be reduced when an amount of the light from the sample is large and the amount to the light to be divided to the optical path of the observing system can be increased when the amount of light from the sample is small.

In the photographing unit for a microscope according to the present invention, the changing member comprises a plurality of prisms or mirrors which have different ratios of division, and the control unit may select one of said plurality of prisms or mirrors based on a detection output of the photometric member so as to insert it into the optical path of the observation system.

The control unit inserts one of the prisms or mirrors which have different ratios of division into the optical paths on the basis of the detection output of the photometric member. Specifically, when an amount of the light from the sample is large, such prism or mirror which renders a small amount of light toward the optical path of the observation system is inserted into the optical path of the observation system, while when the amount of the light from the sample is small, such prism or mirror which renders a large amount of light toward the optical path of the observation system large is inserted into the optical path of the observation system.

Another aspect of a photographing unit for a microscope according to the present invention involves the provision of an object detector which detects the presence of an object (e.g. photographer) who approaches the optical path of the observation system, wherein the control unit may determine which prism or mirror is to be selected based on detection outputs of the object detector and the photometric member.

Since a prism which has a large ratio of division of a light to the photometric detector is inserted into the optical path when the photographer does not look in the viewfinder, it is possible to irradiate a larger amount of light to the photometric detector.

In another aspect of a photographing unit for a microscope according to the present invention, the changing member is an attenuation filter, and the control unit may control insertion/retraction of the attenuation filter into/from the optical path of the observation system based on the detection output of the photometric member.

Since the control unit controls the attenuation filter based on an output of the photometric detector, an amount of a light to the optical path of the observation system can be reduced when an amount of a light from the sample is large, and an amount of the light to the optical path of the observation system can be increased when an amount of the light from the sample is small.

Another object of the present invention is to provide a photographing unit for a microscope which can take a photograph with appropriate exposure by a simple operation and can be made at a low cost.

In order to achieve the above object, a photographing unit for a microscope according to the present invention includes a light dividing member which divides a light from a sample into an optical path of a photographing system and for an optical path of an observation system, a light shielding member which shields the optical path of the observation system, a detection member which detects an approach of an object (e.g. photographer) to the observation system, and a control unit which performs insertion/retraction of the light shielding member into/from the optical path of the observation system based on a detection output of the detection member.

When the photographer approaches the observation system in order to observe the sample, the detection member detects the photographer and the light shielding member is removed from the optical path of the observation system so as to observe the sample to be photographed. When the photographer does not observe the sample, the light shielding member shields the optical path of the observation system, and only light from the sample is guided to the optical path of the photometric system so that correct photometry of the sample can be conducted without an influence of light outside the microscope which enters from the optical path of the observation system.

In another aspect of photographing unit for a microscope according to the present invention, the light dividing member comprises a plurality of prisms or mirrors which have different ratios of division, and the control unit synchronizes a changing-over of the prism or mirror with the insertion/retraction of the light shielding member into/from the optical path of the observation system, and may select such prism or mirror which renders a larger amount of light toward the optical path of the photometric system than that when the light shielding member is retracted from the optical path of the observation system when the light shielding member is inserted into the optical path of the observation system.

When the light shielding member is inserted into the optical path, an amount of a light toward the photometric system is increased by a prism or mirror inserted into the optical path, so that the photometry can be conducted with a larger amount of light than that in the conventional unit.

In another aspect of a photographing unit for a microscope according to the present invention, the light shielding member is integrally formed with a support member for supporting the light dividing member. A driving mechanism which is dedicated for insertion/retraction of the light shielding member into/from the observation optical path is no longer necessary.

Still another object of the present invention is to provide a photographing unit for a microscope which properly switches over on/off states of illumination of a reticle, and further a photographing unit for a microscope which is free from a probability of inappropriate exposure. It is also an object of the present invention to provide a photographing unit for a microscope which illuminates the reticle with light of an optimal color and an optimal brightness in response to the color (wavelength) of the light from the sample.

In order to achieve the above objects, the present invention provides a photographing unit for a microscope includes a photometric member which measures light from a sample, a viewfinder for observing an image of the sample, an index member having an index which is provided in an optical path toward the viewfinder and can be observed together with the sample image, an illumination member which illuminates the index, and a control unit which controls the on/off states of an illumination light of the illumination member in accordance with the intensity of a detection signal from the photometric member.

The index provided on the index member is a frame which indicates an area to be exposed on a film at the photographing or a scale which indicates the size of the sample. Usually, this index is a black line which can be observed together with the sample image. However, this index can not be seen when it is observed with a dark-field illumination or when a fluorescent sample image is observed in which case only the fluorescent sample is lit and the background is dark. Accordingly, when a light from the sample is relatively in a small amount, the control unit puts on the illumination of the index member by the illumination member, so that the index is lit to confirm the index member together with the sample image. Therefore, a troublesome operation for turning on/off illumination of the index member can be avoided so that it is possible to prevent the illumination from being forgotten to be turned on or off.

Also, the photographing unit of the present invention further comprises an operating member for conducting an exposing (e.g. photographing) operation and is characterized in that the control unit executes an exposure calculation for exposure (photographing) based on a detection signal from the photometric member after the illumination light of the illumination member is turned off, when the exposure (photographing) is instructed from the operating member.

For this reason, when photometry is conducted by the photometric member, an accurate exposure calculation is possible without an influence of stray to illumination light from the illumination member.

Also, the control unit controls the brightness of the illumination light by the illumination member in such a manner that the brightness of the reticle is appropriate with respect to the brightness of the sample in accordance with the intensity of the detection signal from the photometric member when the illumination is turn on.

Thus, the index of the reticle is always indicated with visible brightness.

Further, according to the present invention, a photographing unit for a microscope further comprises a detection member which detects the presence of an object (e.g. microscope observer) in the vicinity of the viewfinder, and is characterized in that the control unit turns on the illumination of the index member by the illumination member only when the detection member detects the presence of the observer so as to conduct the illumination control in such a manner that the brightness of the sample is inversely proportional to the brightness of the illumination of the index member.

As an example of the detection member, there is a sensor of a light reflection type which emits light to the vicinity of an eye contact portion of the viewfinder to detect a reflection light thereof. Then, a detection area is determined such that reflection light from the face of the observer is detected when the microscope observer looks in the viewfinder and this light is not detected when the face is separated away from the viewfinder to some extent. Thus, it is possible to turn on the illumination of the index member only when the microscope observer looks in the viewfinder, which can prevent unnecessary illumination.

In addition, the present invention is characterized in that the illumination member is capable of selectively emitting light of any of a plurality of light colors, and a color of light to be emitted by the illumination member is selected so as to illuminate the index member with light having a different color from that of the light from the sample.

The illumination member may have a plurality of light sources having different light colors, and may have a plurality of color filters for transmitting light of different colors which are provided in an exchangeable way on the exit side of the light of the light source which emits white light. Since the control unit controls the illumination member to illuminate the index member with a color different from the color of the light from the sample, the index is always displayed in a distinct color from the color of the light from the sample.

DESCRIPTION OF THE PREFERRED EMBODIMENTS

Embodiments of the present invention will be described below with reference to the drawings. In these drawings, portions similar to those in a conventional photographing unit for a microscope are given the same reference numbers, and description thereof will be omitted.

Figure 1:
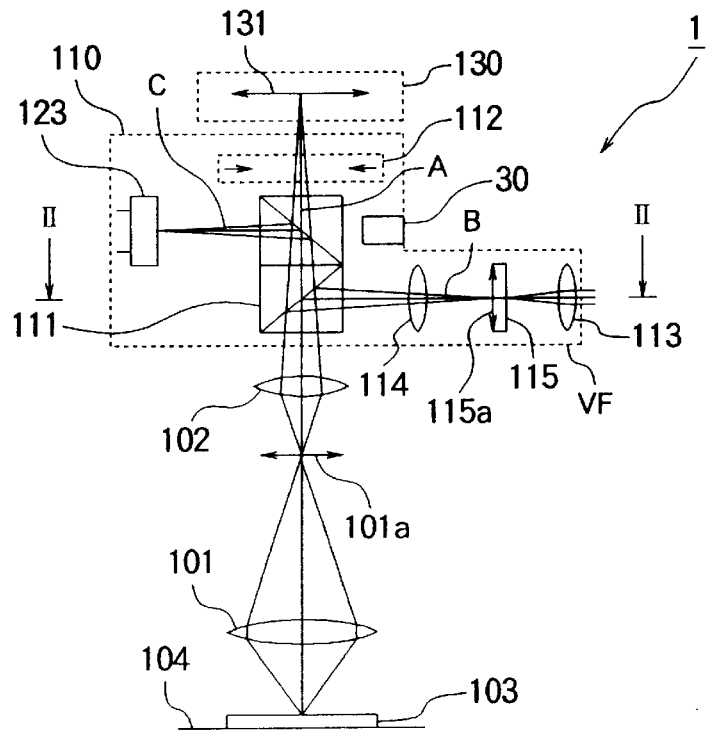
FIG. 1 is a view for explaining optical paths of a microscopic device which is provided with a photographing unit for a microscope according to a first embodiment of the present invention.

FIG. 1 is a view for explaining a photographing unit 110 for a microscope 1 according to the first embodiment of the present invention.

Figure 3:
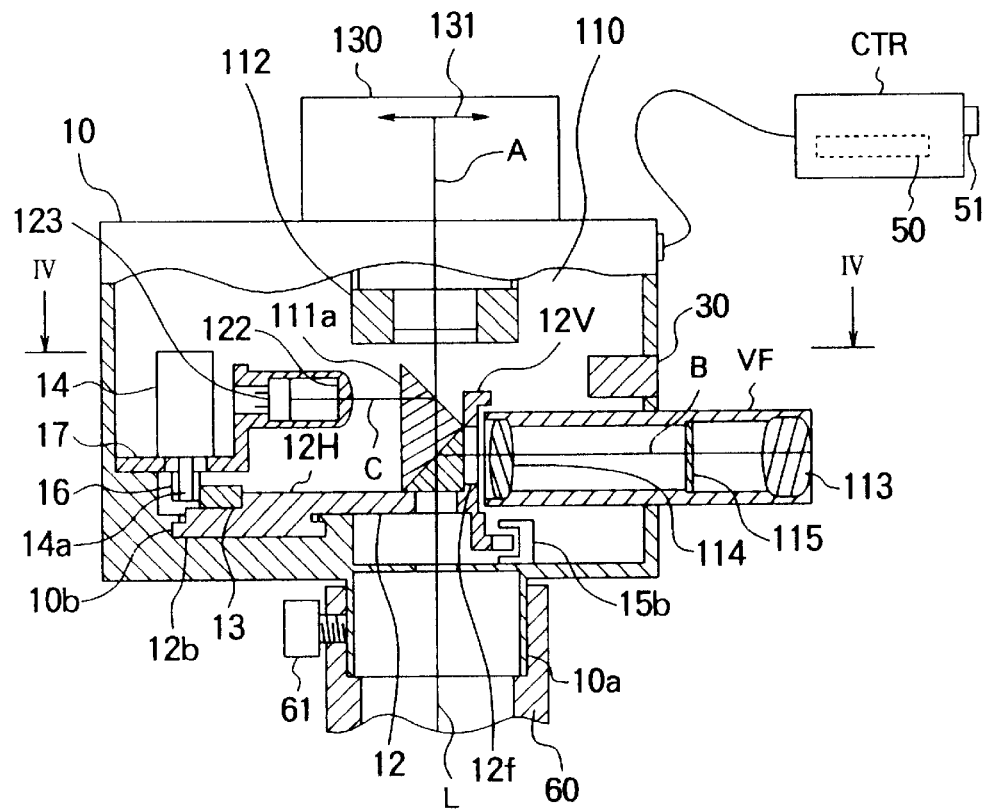
FIG. 3 is an exploded cross-sectional view for showing a portion of a photographing unit for a microscope to which the first embodiment: of the present invention is applied.

The microscopic device 1 according to this embodiment is provided with two prisms (changing member) 111a and 111b having different ratios of division, an object detector (e.g. approach sensor) 30 for detecting an approach of the object (e.g. the photographer) to an optical path of an observation system, and a control unit 50 for selecting either one of the two prisms (changing means) 111a and 111b when detecting the photographer based on a detection output of the object detector 30 (see FIG. 3). In addition, an objective lens 101, a projection lens 102, a photographing unit 110 for a microscope, and a camera 130 are provided.

The prisms 111a and 111b are used for dividing light from a sample 103 into an optical path A of a photographing system, an optical path B of an observation system, and an optical path C of a photometric system. The ratio of division of the prism 111b is set so as to direct light toward the optical path B of the observation system in a larger amount than the prism 111a, and a reflection surface of the prism 111b is arranged so as to direct the same amount of light toward the optical path C of the photometric system as that by the prism 111a.

Figure 2:
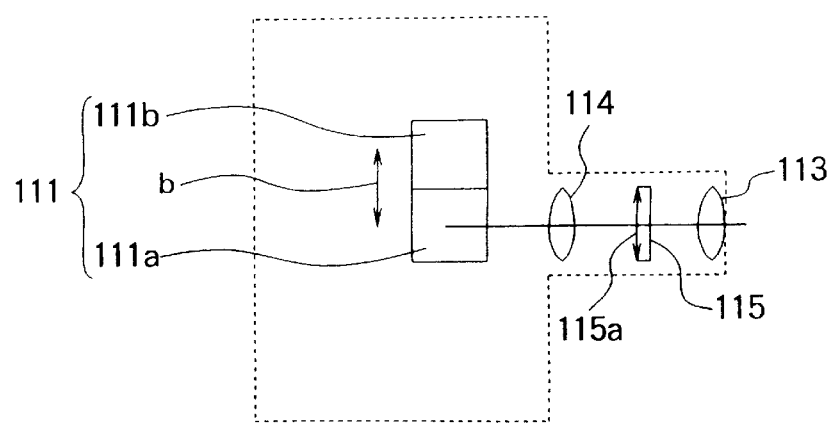
FIG. 2 is a view for showing a portion taken along the line II—II in FIG. 1.

These prisms 111a and 111b are moved as indicated by the arrow b in FIG. 2 to be inserted into the optical path.

In another aspect of the first embodiment, the ratios of light amounts toward the optical path C of the photometric system directed by the prism 111a and the prism 111b may be different from each other. In this case, a light amount from the sample 103 is determined by multiplying an output of a photometric detector 123 for controlling the prisms 111a and 111b by a coefficient which is determined based on a ratio of division toward the optical path C of the photometric system of the prism 111a or the prism 111b inserted into the optical path.

The object detector 30 is a sensor for detecting the presence of a photographer who looks in a viewfinder VF by using the principle of an object detector of an optical type or the principle of the triangulation.

Figure 4:
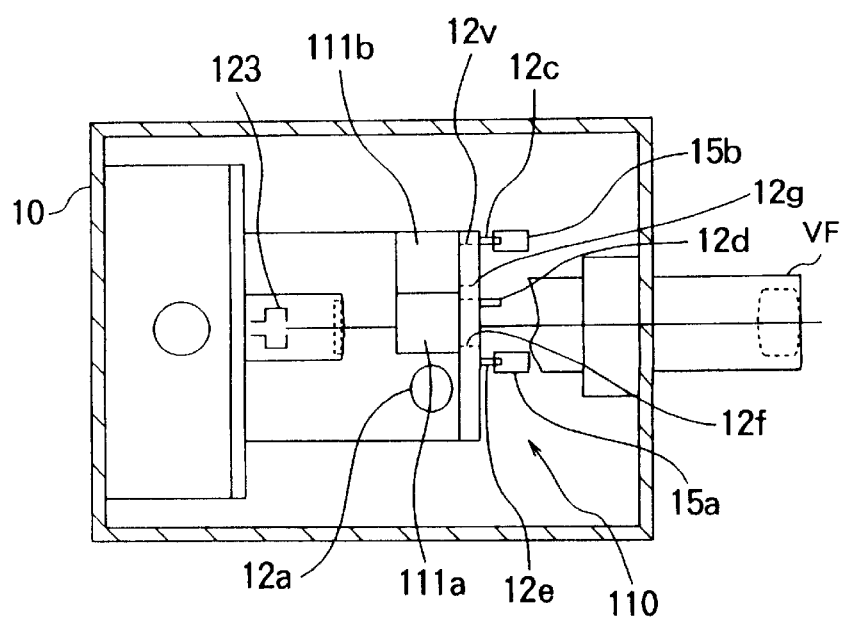
FIG. 4 is a view for showing a portion taken along the line IV—IV in FIG. 3.
Figure 5:
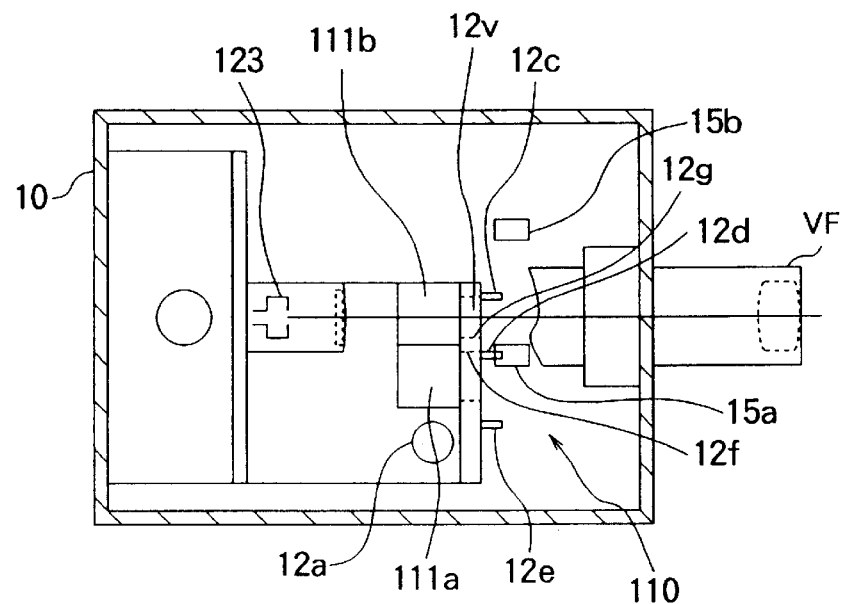
FIG. 5 is an exploded cross-sectional view for showing a portion of a photographing unit for a microscope.
Figure 6:
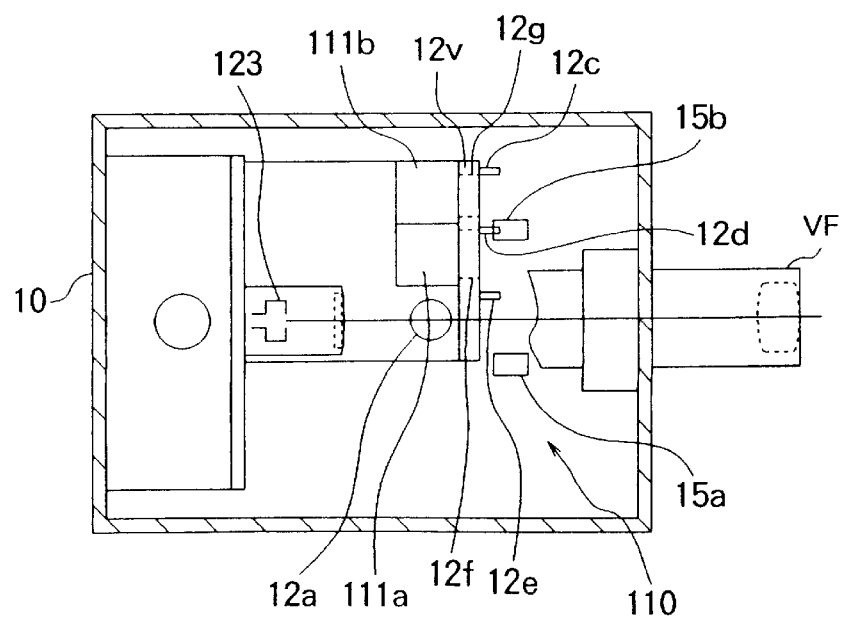
FIG. 6 is an exploded cross-sectional view for showing a portion of a photographing unit for a microscope.
Figures 7, 8:
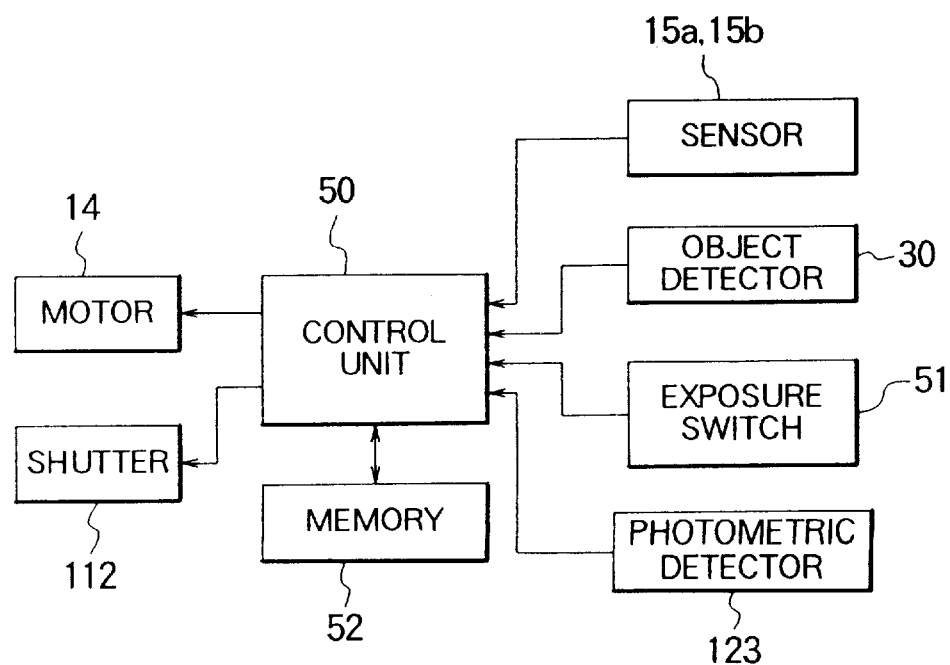
FIG. 7 is a table for showing a relationship between a position sensor on the optical path and an output from a sensor 15a or 15b.
FIG. 8 is a block diagram for showing a schematic configuration of a control system.

FIG. 3 is an exploded cross-sectional view for showing a portion of the photographing unit for a microscope to which a first embodiment is applied, FIG. 4 is a view for showing the portion taken along the line IV—IV in FIG. 3, FIG. 5 is an exploded cross-sectional view for showing a portion of a photographing unit for a microscope, FIG. 6 is an exploded cross-sectional view for showing a portion of a photographing unit for a microscope, and FIG. 7 is a table for showing a relationship between the prisms on the optical path and outputs from the position sensors 15a and 15b. Note that FIG. 3 and FIG. 4 show an observation state, FIG. 5 a photometric state, and FIG. 6 an exposure state, respectively.

The photographing unit 110 for a microscope is provided with the prisms 111a and 111b, a prism support member 12, a rack 13, a motor 14, the photometric detector 123, photosensors (sensors) of a gap type 15a and 15b, a reticle 115, a reduction lens 114, an eyepiece 113, a shutter 112, and the object detector (approach sensor) 30, and is received in a housing 10.

The prism support member 12 takes an L shape which is comprised of a horizontal portion 12H and a vertical portion 12V. On the lower surface of one end of the horizontal portion 12H there is formed a guide portion 12b which is engaged with a guide groove 10b formed in the housing 10, so that the prism support member 12 can be moved along the guide groove 10b in the vertical direction with respect to the surface of the drawing.

The rack 13 is fixed to the one end of the horizontal portion 12H and a gear 16 which is fixed onto the shaft 14a of the motor 14 is meshed with this rack 13, so that the prism support member 12 (prisms 111a and 111b) is moved when the motor 14 is driven. Note that the motor 14 is mounted on a motor support member 17 which is fixed to the housing 10.

In order to project an image of a sample at a proper magnification, a photometric lens 122 is provided between the photometric detector 123 and the prisms 111a and 111b.

On the other end of the horizontal portion 12H to which the prisms 111a and 111b are fixed, there is formed a hole 12a for irradiating a film with all of the light from the sample 103 at the exposure.

The prisms 111a and 111b and the hole 12a are arranged along a direction perpendicular to the optical axis L and the optical path C of the photometric system.

The prism 111a is arranged to direct 10% of the light from the sample toward the optical path B of the observation system, 90% to the optical path C of the photometric system, and the prism 111b is arranged to direct 100% of the light to the optical path B of the observation system.

On the lower surface of the other end of the horizontal portion 12H, there are provided three projections 12c to 12e which are projecting in the horizontal direction, so that when the prism support member 12 is moved, at least one of the three projections 12c to 12e crosses a gap of either of the two photo sensors 15a and 15b of the gap type provided in the housing 10.

In each of these photo sensors 15a and 15b, a light transmitting portion and a light receiving portion are provided opposite to each other with a gap therebetween. When a light shielding body (any of the projections 12c to 12e) comes into the gap, light incident from the light transmitting portion on the light receiving portion is intercepted, and an output electric current is decreased. Thus, the presence of any of the projections 12c to 12e is detected owing to this change in the electric current.

In any state, one or more projections 12c to 12e are present in the gaps of the sensors 15a and 15b (see table of FIG. 7), so that the positions of the prisms 111a and 111b can be detected based on outputs from these sensors 15a and 15b to generate a time to stop the motor 14 when the prisms 111a and 111b are moved.

Note that in FIG. 7, "ON" indicates that the projections 12c to 12e are present in the gaps of the sensors 15a and 15b, and "OFF" indicates that the projections 12c to 12e are not present in the gaps of the sensors 15a and 15b, respectively.

The vertical portion 12V which is connected to the other end of the horizontal portion 12H is provided with holes 12f and 12g for ensuring an optical path toward the optical path B of the observation system at positions corresponding to the prisms 111a and 111b.

An operation of this photographing unit 110 is controlled by a controller CTR which is provided with a control unit 50 will now be described.

The camera 130 which contains a film 131 is fixed onto the upper surface of the housing 10. A straight cylindrical portion 60 of the barrel of the microscope is attached to a sleeve 10a which is formed on the lower surface of the housing 10 and is fixed by a clamp screw 61.

On the side of the photographer (on the right side of the housing 10 in FIG. 3), there is provided the viewfinder VF projecting for confirming the photographing range or the focus. This viewfinder VF is comprised of the reticle 115, the reduction lens 114, and the eyepiece 113.

The object detector 30 is provided above the viewfinder VF in the housing 10.

Figure 9:
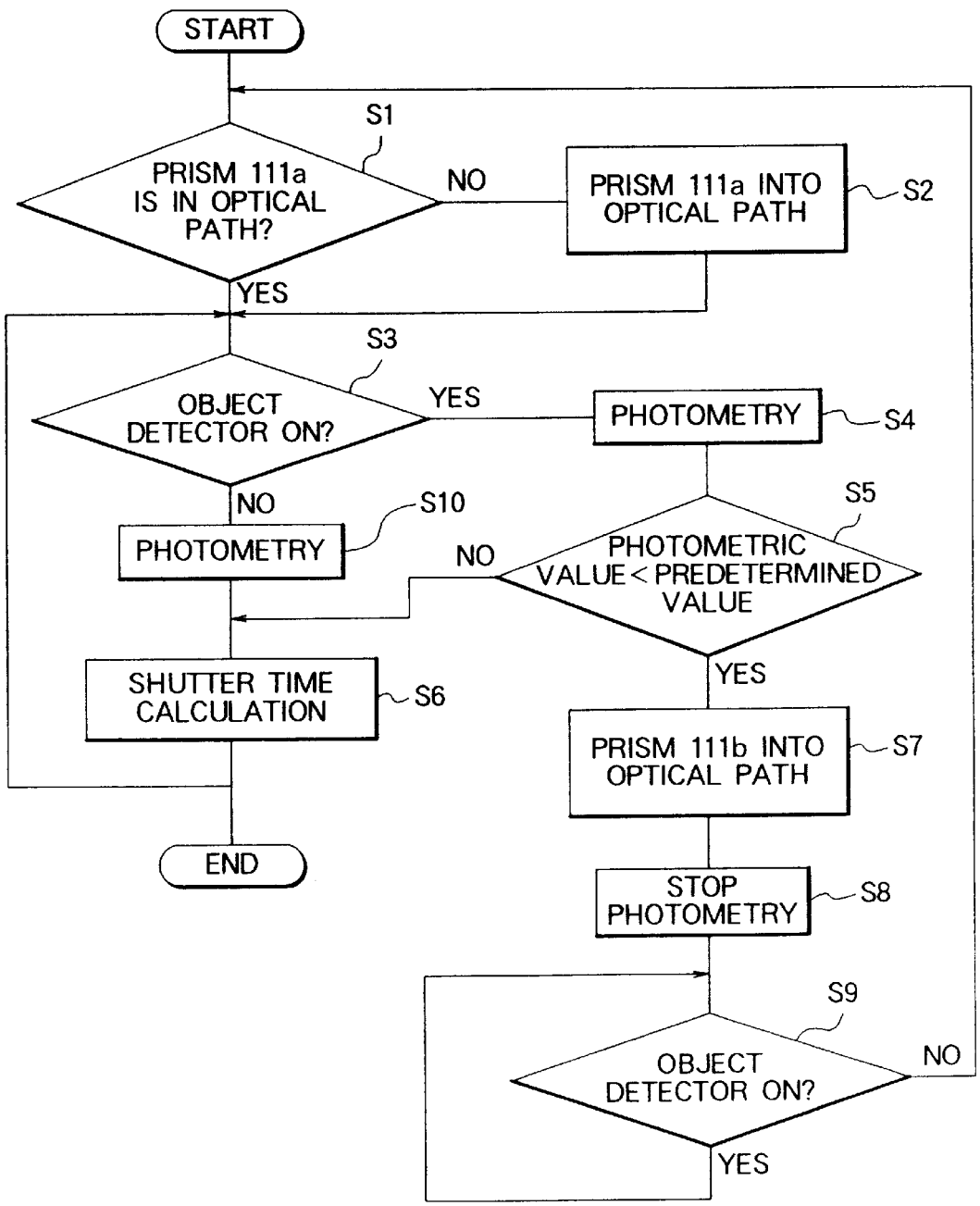
FIG. 9 is a flowchart for explaining an inserting/retracting operation of the prism.

FIG. 8 is a block diagram for showing a schematic configuration of the control system, and FIG. 9 is a flowchart for explaining an inserting/retracting operation of the prisms. Note that in FIG. 9, S1 to S10 denote the steps of the operation.

The control unit 50 is comprised of, for example, a one-chip microcomputer or a one-chip CPU. Information from the photo-sensors 15a and 15b, the object detector 30, the photometric detector 123 and an exposure switch 51 (which is provided on the controller CTR) is supplied to the control unit 50. With this information, the control unit 50 controls operations of the motor 14 and the shutter 112.

The inserting/retracting operation of the prisms will be described below with reference to FIGS. 3 to 9.

The control unit 50 judges whether or not the prisms 111a and 111b are positioned in the optical path, based on outputs of the two photo-sensors 15a and 15b. Usually, the prism 111a is arranged on the position from which the light is supplied toward the optical path C of the photometric system and the optical path B of the observation system (the position shown in FIG. 4).

When the prism 111a is not positioned in the optical path of the microscope (S1), the prism 111a is inserted into the optical path (S2).

When prism 111a is positioned in the optical path, 90% of the light from the sample 103 is directed to the optical path C of the photometric system, while 10% to the optical path B of the observation system. In this state, photometry is conducted all the time, and the control unit 50 to which a photometric value is supplied calculates a shutter time based on a photometric value from the photometric detector 123, and stores this calculated shutter time in a memory 52.

On the other hand, the object detector 30 monitors the object (e.g. photographer) all the time (S3).

When the photographer brings his face close to the viewfinder VF to look into it, the photometry at that time is conducted (S4), and a photometric value is supplied to the control unit 50.

The control unit 50 compares this photometric value with a predetermined reference value (S5).

The control unit 50 does not move the prism 111a from the optical path B of the observation system when the photometric value is larger than the reference value, calculates the shutter time based on the photometric value (S6), and stores the shutter time into the memory 52.

The control unit 50 drives the motor 14 when the photometric value is smaller than the predetermined reference value, so as to insert the prism 111b, instead of the prism 111a, into the optical path of the microscope, as shown in FIG. 5 (S7) The control unit 50 monitors outputs of the sensors 15a and 15b at the same time, and stops the motor 14 based on a change in the electric current output from either the sensor 15a or the sensor 15b, thereby stopping the prism 111b in the optical path of the microscope.

In this state, since 100% of the light from the sample 103 is directed to the optical path B of the observation system and does not enter the photometric detector 123, the photometric function is stopped (S8).

Also in this state, the object detector 30 monitors the photographer (S9). When the photographer moves his face away from the viewfinder VF, the control unit 50 inserts the prism 111a into the optical path of the microscope so as to conduct the photometry for the second time, and drives the motor 14 so that the light is directed to the optical path C of the photometric system.

In this case, when a change in the output current of at least one of the sensors 15a and 15b is detected, the motor 14 is stopped so as to stop the prism 111a in the optical path of the microscope.

When an approach of the photographer is not detected at Step 3 (S3), the photometry by the photometric detector 123 is conducted (S10).

The control unit 50 calculates the shutter time based on the photometric value (S6), and stores this shutter time into the memory 52.

After that, when the exposure switch 51 is pressed, the control unit 50, after moving the prisms 111a and 111b to the positions shown in FIG. 6, opens the shutter 112 in accordance with the shutter time stored in the memory 52 so as to conduct the exposure of the surface of the film 131. The control unit 50 then drives the motor 14 to return the prisms 111a and 111b to the positions shown in FIG. 4.

Note that when the exposure operation switch 51 is pressed in the state at Step 7 (S7), light is temporarily directed to the photometric optical path C (FIG. 4), the photometry and the calculation of the shutter time are conducted, and the prisms 111a and 111b are moved further to the positions shown in FIG. 6. After that, the shutter 112 is opened in accordance with the shutter time stored in the memory 52 to conduct exposure of the surface of the film 131.

According to this embodiment, when the photographer does not look in the viewfinder VF, the prism having a larger ratio of light amount division to the photometric detector 123 enters the optical path, so that a larger amount of light can be applied to the photometric detector 123. As a result, the photometry can be conducted with a high accuracy.

When the photographer looks in the viewfinder VF, one of the prisms 111a and 111b is selected to be inserted into the optical path of the microscope based on the photometry which is conducted immediately before, with a high accuracy so that the observation can be conducted with a more appropriate brightness.

Note that the number of kinds of prisms is not limited to two, but may be three or four. The control of a light amount toward the optical path B of the observation system can be conducted with more accuracy, by increasing the number of kinds of prisms.

Figure 10:
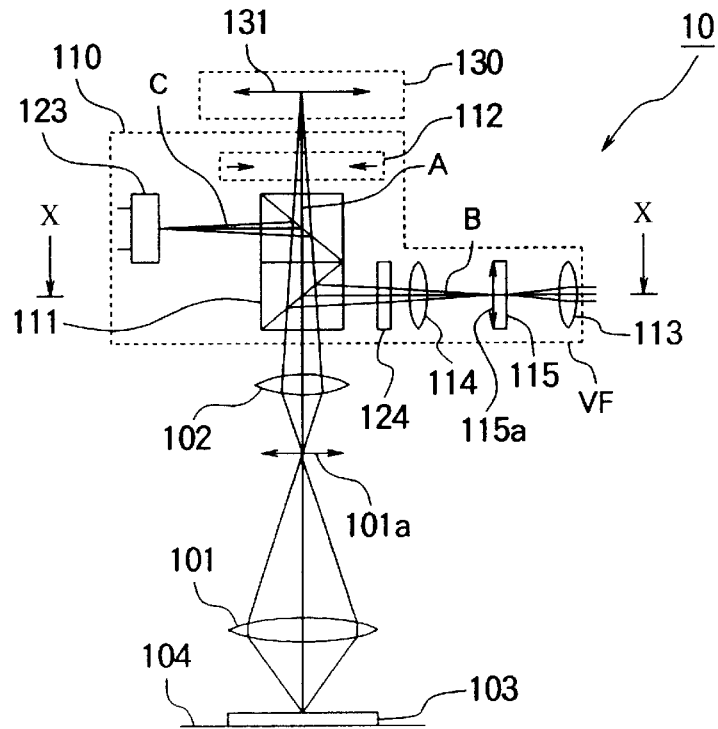
FIG. 10 is a view for explaining an optical path of a microscopic device which is provided with a photographing unit for a microscope according to a second embodiment of the present invention.
Figure 11:
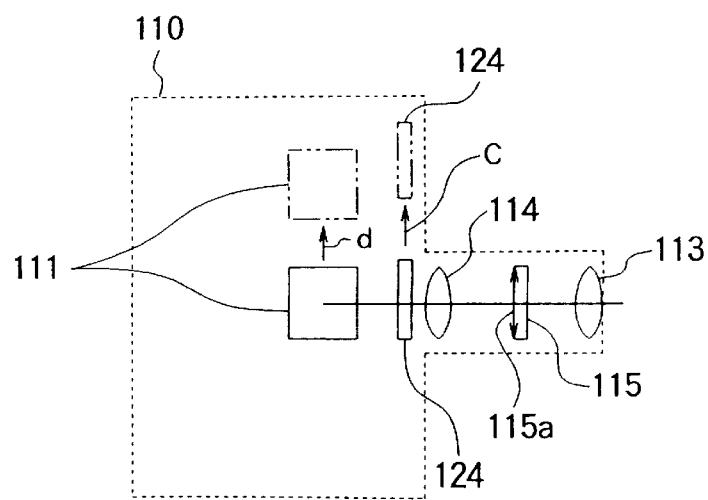
FIG. 11 is a view for showing a portion taken along the line X—X in FIG. 10.
Figure 12:
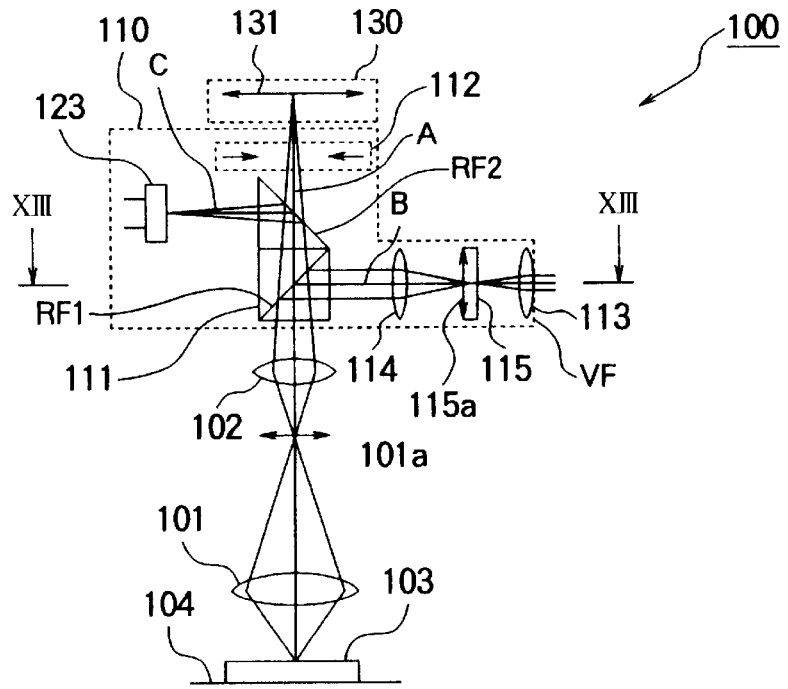
FIG. 12 is a view for explaining an optical path of a microscopic device which is provided with a conventional photographing unit.
Figure 13:
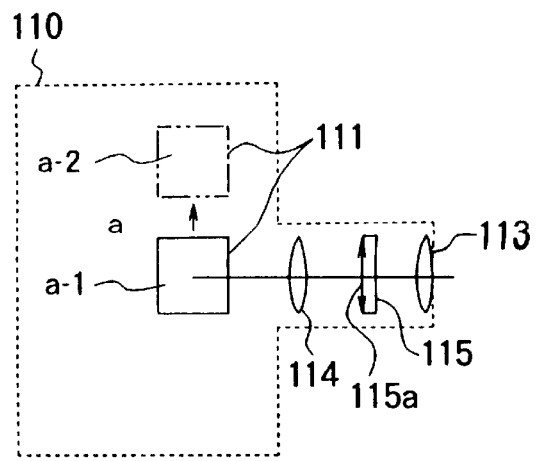
FIG. 13 is a view for showing a portion taken along the line XIII—XIII in FIG. 12.

FIG. 10 is a view for explaining the optical path of the microscopic device which is provided with a photographing unit for a microscope according to the second embodiment of the present invention. FIG. 11 is a view for showing the portion taken along the line X—X in FIG. 10.

A microscopic device 10 according to the second embodiment is different from the microscopic device 1 according to the first embodiment in that there is provided one prism and the brightness of the optical path B of the observation system can be changed by inserting/retracting an attenuation filter 124 into/from the optical path B of the observation system.

As the attenuation filter 124, an ND (Neutral Density) filter having a light transmittance density of ½, 1/10, 1/20, or the like, can be used. As the ND filter, a variable density filter capable of varying a light transmittance can be used.

When an amount of a light from the sample 103 is large, the attenuation filter 124 is inserted into the optical path B of the observation system, as indicated by the solid line in FIG. 11. When an amount of the light from the sample 103 is small, the attenuation filter 124 is moved to the position indicated by the double-dotted line, as shown by the arrow c in FIG. 11, so as to be removed from the optical path B of the observation system. Therefore, there arises a less change in the brightness of an image plane 115a of the viewfinder so that an observation with the viewfinder can be carried out with a more appropriate light amount than that in the conventional unit.

Note that the prism 111a or 111b is moved from the position indicated by the solid line to the position indicated by the double-dotted line, as shown by the arrow d in FIG. 11, during the exposure.

The photographing unit 110 to which this second embodiment is applied measures an amount of light from the sample 103 by use of the photometric detector 123 and controls the insertion/retraction of the attenuation filter 124 (corresponding to the prisms 111a and 111b in the first embodiment) into/from the optical path B of the observation system based on a photometric value of the photometric detector 123, in the same manner as in the first embodiment.

Accordingly, the same effects as those obtained in the first embodiment can be obtained also in this second embodiment.

Figure 14:
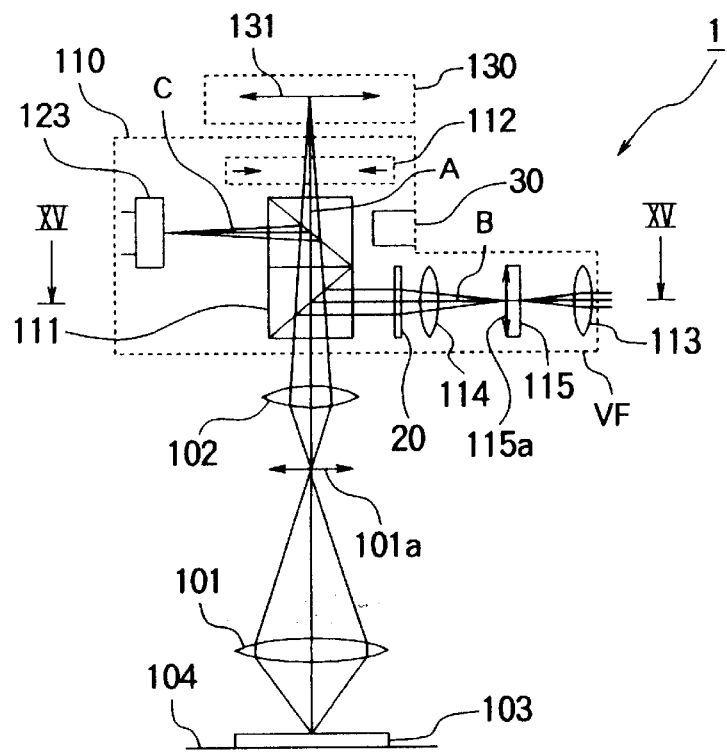
FIG. 14 is a view for explaining an optical path of a microscopic device which is provided with a photographing unit for a microscope according to a third embodiment of the present invention.
Figure 15:
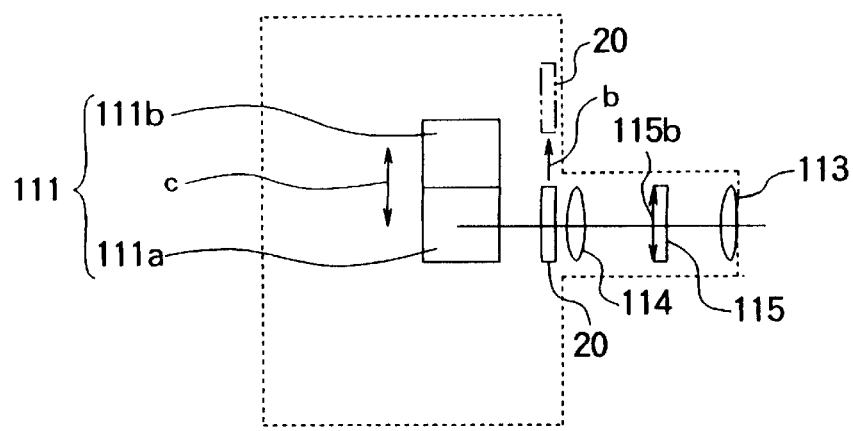
FIG. 15 is a view for showing a portion taken along the line XV—XV in FIG. 14.

FIG. 14 is a view for explaining an optical path of a microscopic device which is provided with a photographing unit for a microscope according to the third embodiment of the present invention. FIG. 15 is a view for showing the portion taken along the line XV—XV in FIG. 14.

Figure 16:
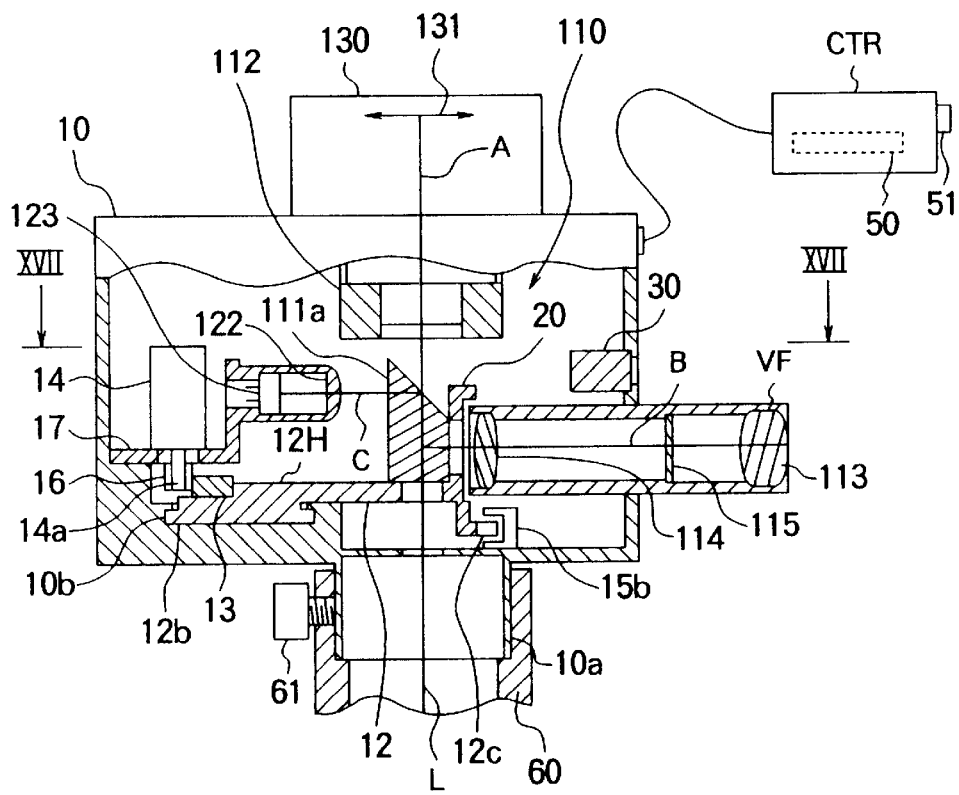
FIG. 16 is an exploded cross-sectional view for showing a portion of a photographing unit for a microscope.

The microscopic device 1 according to this third embodiment is provided with a light shielding member 20 for shielding the optical path B of the observation system, an object detector 30 for detecting an approach of the object (e.g. photographer) to the observation system, and a control unit 50 for inserting/retracting the light shielding member 20 into/from the observation system based on a detection output of the object detector 30 (see FIG. 16). In addition, an objective lens 101, a projection lens 102, a photographing unit 110 for a microscope, and a camera 130 are provided.

The object detector 30 detects the photographer who brings his face close to the viewfinder VF.

The light shielding member 20 is arranged to be freely inserted or retracted into or from the optical path B of the observation system, and is moved based on a detection output of the object detector 30, as indicated by the arrow b in FIG. 15.

A prism (light dividing means) 111 is comprised of a prism 111b with a ratio of division which can direct a large amount of light toward the optical path B of the observation system and a prism 111a with a ratio of division which can direct the same amount of light as that directed to the optical path B of the observation system by the prism 111b toward the optical path C of the photometric system, and is moved as indicated by the arrow c in FIG. 15.

The object detector 30 is a sensor which employs, for example, the principle of an object detector of an optical system or the principle of the triangulation, like that in a preceding embodiment.

Figure 17:
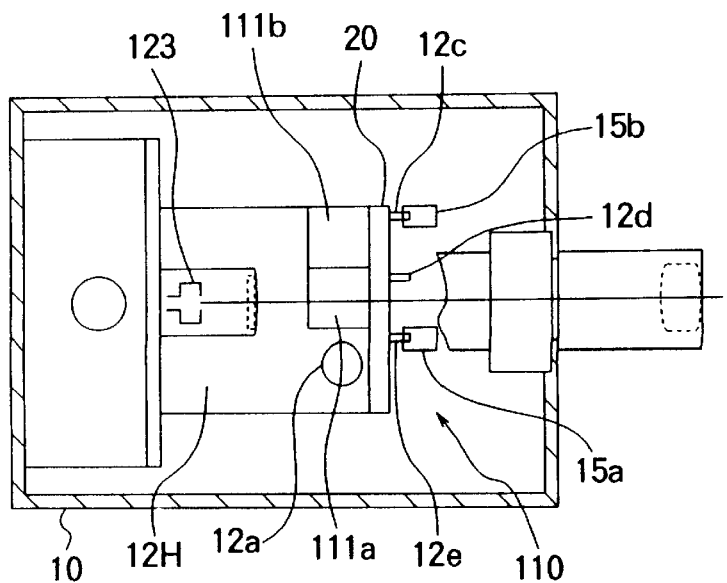
FIG. 17 is a view for showing a portion taken along the line XVII—XVII in FIG. 16.
Figure 18:
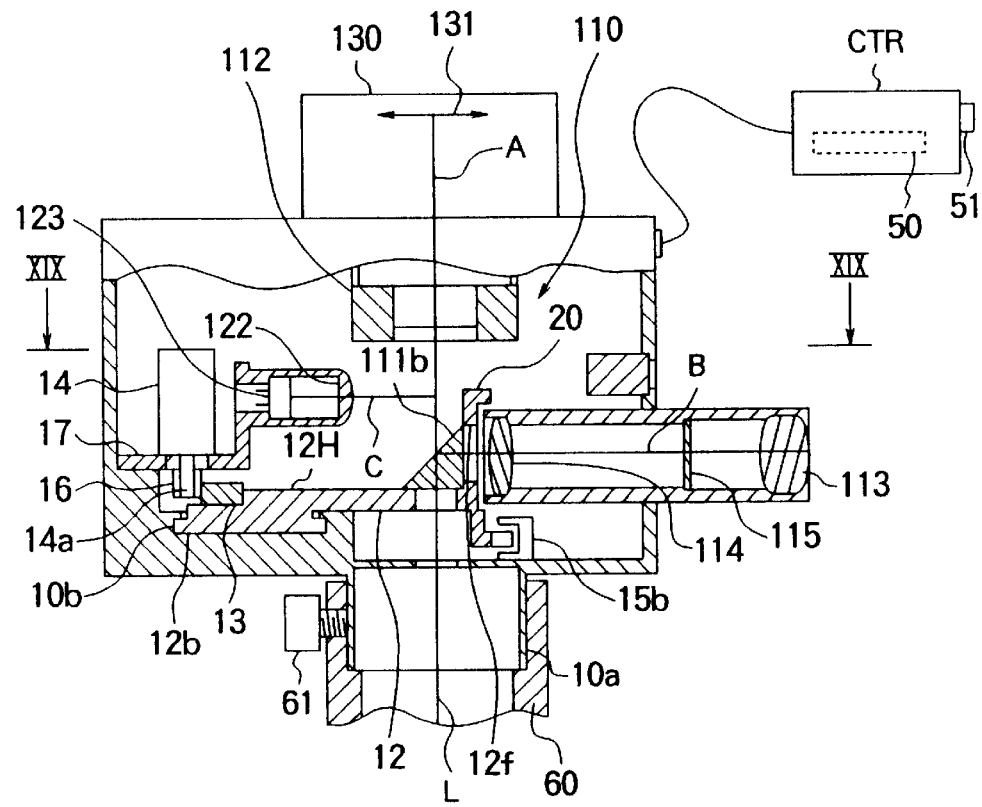
FIG. 18 is an exploded cross-sectional view for showing a portion of a photographing unit for a microscope.
Figure 19:
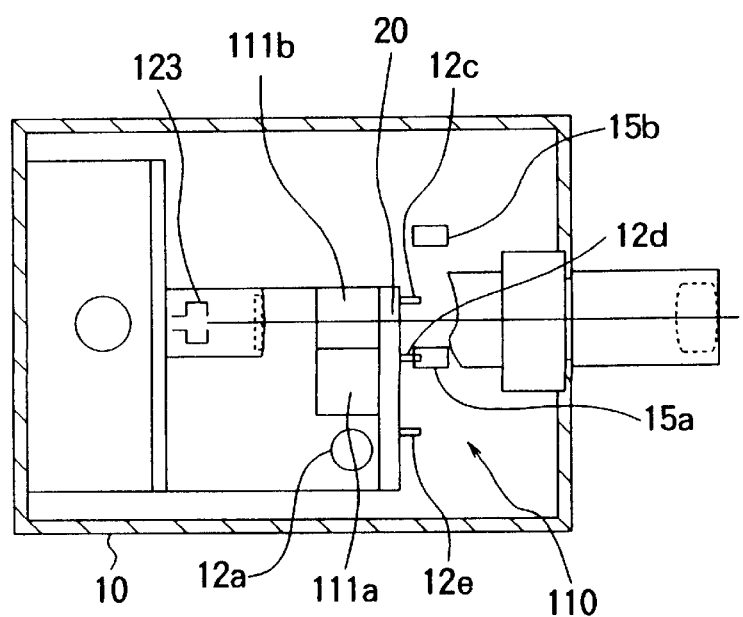
FIG. 19 is a view for showing a portion taken along the line IXX—IXX in FIG. 18.
Figure 20:
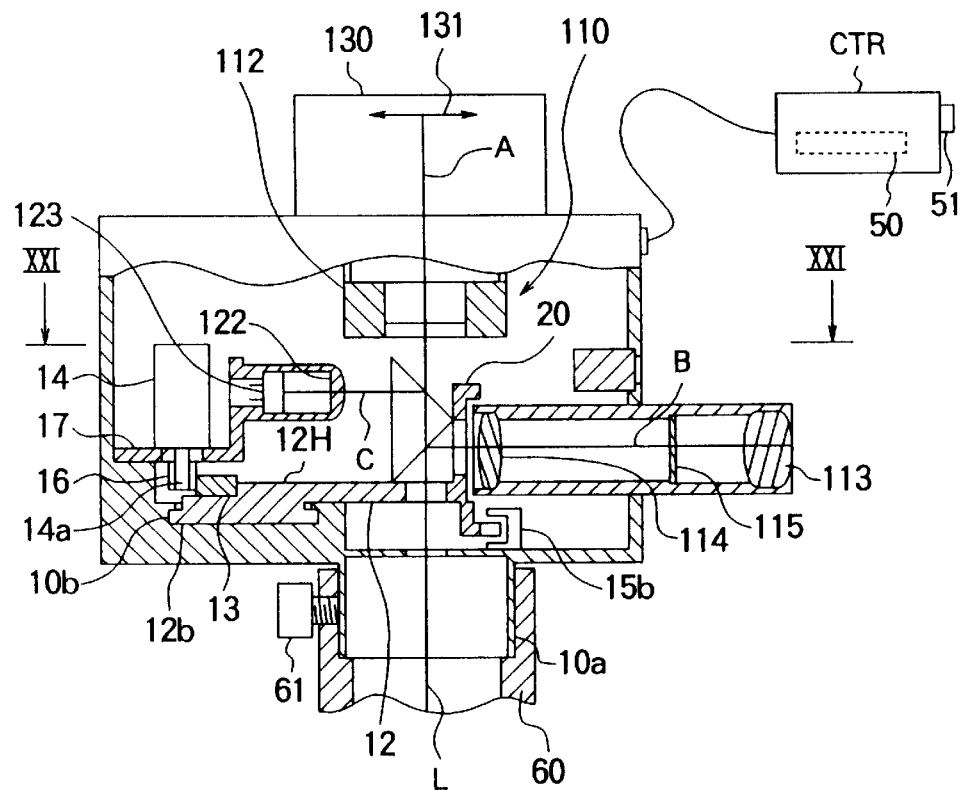
FIG. 20 is an exploded cross-sectional view for showing a portion of a photographing unit for a microscope.
Figure 21:
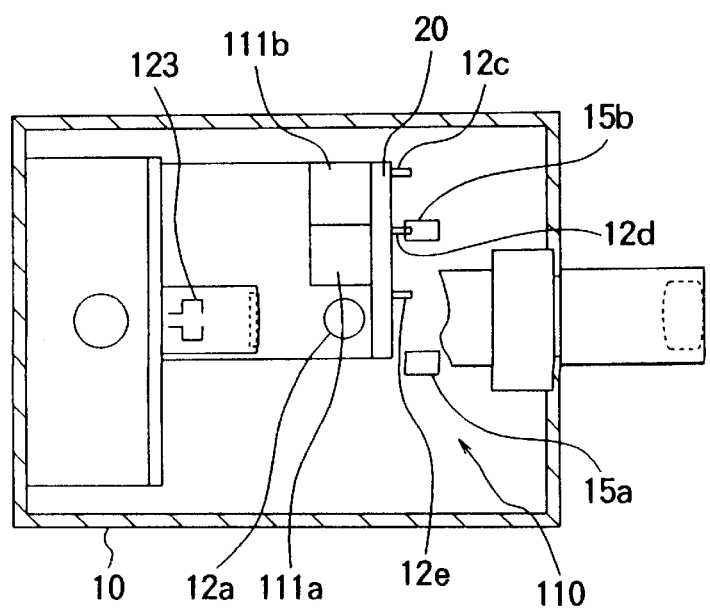
FIG. 21 is a view for showing a portion taken along the line XXI—XXI in FIG. 20.

FIG. 16 is an exploded cross-sectional view for showing a portion of the photographing unit for a microscope to which the third embodiment is applied. FIG. 17 is a view for showing the portion taken along the line XVII—XVII in FIG. 16. FIG. 18 is an exploded cross-sectional view for showing a portion of the photographing unit for a microscope. FIG. 19 is a view for showing the portion taken along the line IXX—IXX in FIG. 18. FIG. 20 is an exploded cross-sectional view for showing a portion of the photographing unit for a microscope. FIG. 21 is a view for showing the portion taken along the line XXI—XXI in FIG. 20. Note that FIGS. 16 and 17 show a photometric state, FIGS. 18 and 19 show an observation state, and FIGS. 20 and 21 show an exposure state, respectively.

The basic structure of the photographing unit 110 is the same as that in each of the preceding embodiments.

A prism support member 12 takes an L shape which is comprised of a horizontal portion 12H and a light shielding member 20 which is provided perpendicular to this horizontal portion 12H. At one end of the horizontal portion 12H there is formed a guide portion 12b which is engaged with a guide groove 10b formed in a housing 10, so that the prism support member 12 can be moved along the guide groove 10b in the vertical direction with respect to the surface of the drawing.

A rack 13 is fixed onto the one end of the horizontal portion 12H and a gear 16 which is fixed onto the shaft 14a of a motor 14 is meshed with this rack 13, so that the prism support member 12 (prisms 111a and 111b) is moved when the motor 14 is driven. Note that the motor 14 is mounted on a motor support member 17 which is fixed to the housing 10.

In order to project an image of a sample at a proper magnification, a photometric lens 122 is provided between a photometric detector 123 and the prisms 111a and 111b.

On the other end of the horizontal portion 12H, not only the prisms 111a and 111b are fixed, but also a hole 12a is provided for irradiating a film with all of the light from the sample 103 during exposure.

The prisms 111a and 111b and the hole 12a are arranged along a direction perpendicular to the optical axis L and the optical path C of the photometric system.

The prism 111a is arranged to direct all of the light (100%) from the sample toward the optical path C of the photometric system, while the prism 111b is arranged to direct all of the light (100%) from the sample to the optical path B of the observation system.

Like in each of the preceding embodiments, on the lower surface of the other end of the horizontal portion 12H, three projections 12c to 12e are provided as projecting in the horizontal direction, so that when the prism support member 12 is moved, at least one of the three projections 12c to 12e crosses a gap of either of two photo-sensors 15a and 15b of a gap type provided in the housing 10.

Each of these photo-sensors 15a and 15b has a light transmitting portion and a light receiving portion which are provided opposite to each other with a gap therebetween. When a light shielding body (one of the projections 12c to 12e) comes into the gap, light incident from the light transmitting portion on the light receiving portion is intercepted, to decrease an output current. Thus, the presence of the projections 12c to 12e is detected owing to this change in the electric current. In either state, one or more projections 12c to 12e are present in the gaps of the sensors 15a and 15b (see FIG. 7).

On the other end of the horizontal portion 12H, there is integrally provided a light shielding member 20 for shielding an external light intruding through the viewfinder VF for confirming a photographing range or the focus, as well as shielding the optical path B of the observation system. However, a hole 12f is formed in a portion corresponding to the prism 111b of this light shielding member 20 so as to ensure an optical path toward the optical path B of the observation system (see FIG. 18). Note that the viewfinder VF is comprised of a reticle 115, a reduction lens 114, and an eyepiece 113.

Then, in the same manner, an operation of this photographing unit 110 is controlled by a controller CTR which has a control unit 50.

A camera 130 which contains the film 131 is fixed onto the upper surface of the housing 10. A straight cylindrical portion 60 of the barrel of the microscope is attached to a sleeve 10a which is formed on the lower surface of the housing 10 and is fixed by a clamp spring 61.

An object detector 30 for detecting the photographer who looks in the viewfinder VF is provided above the viewfinder VF of the housing 10.

Figure 22:
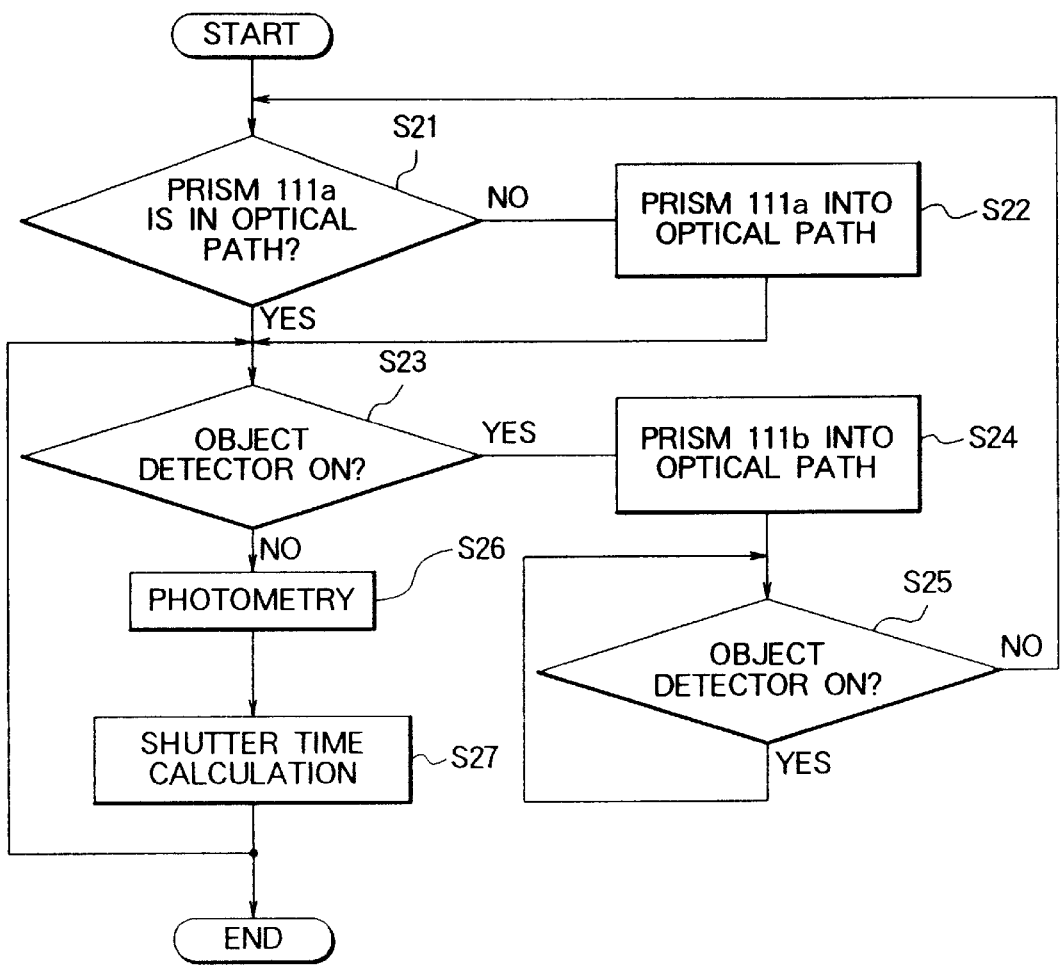
FIG. 22 is a flowchart for explaining an inserting/retracting operation of a light shielding member.

FIG. 22 is a flowchart for explaining an inserting/retracting operation of the prisms. Note that in FIG. 22, S21 to 27 denote the respective steps of the operation.

The control unit 50 is comprised, for example, of a one-chip microcomputer or a one-chip CPU. Information from the photo-sensors 15a and 15b, the object detector 30, the photometric detector 123 and an exposure switch 51 (provided in controller CTR) is supplied to the control unit 50. With this information, the control unit 50 controls operations of the motor 14 and the shutter 112.

The inserting/retracting operation of the light shielding member will be described below with reference to FIGS. 16 to 22.

The control unit 50 judges whether or not the prisms 111a and 111b are positioned on the optical path, based on outputs of the two photo-sensors 15a and 15b (S21). Usually, the prism 111a is arranged on the position (shown in FIGS. 16 and 17) from which the light is directed toward the optical path C of the photometric system.

When the prism 111a is not positioned in the optical path (S21), the prism 111a is inserted into the optical path (S22).

In this state, the external light intruding from the viewfinder VF is shielded by the light shielding member 20, and all of the light from the sample 103 is used for the photometry. The control unit 50 calculates a shutter time based on a photometric value from the photometric detector 123 and stores this calculated shutter time in a memory 52.

On the other hand, the object detector 30 monitors the photographer all the time (S23).

When the photographer brings his face close to the viewfinder VF to look in it, the control unit 50 drives the motor 14, inserts the prism 111b, instead of the prism 111a, into the optical path (S24), as shown in FIG. 18 and FIG. 19, and directs 100% of the light from the sample toward the optical path B of the observation system. The control unit 50 monitors outputs from the sensors 15a and 15b at the same time, and stops the prism 111b in the optical path by applying the brake on the motor 14, based on a change in the output current from either of the sensors 15a and 15b.

In this state, since the photometric detector 123 receives no light, the photometric function is stopped.

Also in this state, the photographer is monitored (S25). When the photographer takes his face away from the viewfinder VF, the control unit 50 inserts the prism 111a into the optical path so as to conduct the photometry for the second time, and drives the motor 14 such that the light is directed to the optical path C of the photometric system.

In this case, when a reduction in the output current of at least one of the sensors 15a and 15b is detected, the motor 14 is stopped so as to stop the prism 111a in the optical path.

When an approach of the photographer is not detected at Step 23 (S23), the photometry by the photometric detector 123 is conducted (S26).

The control unit 50 calculates the shutter time based on the photometric value (S27), and stores this shutter time into the memory.

When the exposure switch 51 is pressed, the control unit 50, after moving the prisms 111a and 111b to the positions shown in FIGS. 20 and 21, opens the shutter 112 in accordance with the shutter time stored in the memory so as to conduct the exposure of the surface of the film 131. The control unit 50 then returns the prisms 111a and 111b to the positions shown in FIGS. 16 and 17.

Note that when the exposure switch 51 is pressed in the state at Step 24 (S24), the light is temporarily directed to the photometric optical path C so as to conduct the photometry (S26) and the calculation of the shutter time (S27). Further, after the prisms 111a and 111b are moved to the positions shown in FIGS. 20 and 21, the shutter 112 is opened in accordance with the shutter time which is stored in the memory so as to conduct the exposure of the surface of the film 131.

According to this embodiment, a troublesome cap removing operation for each frame of the film which is conventionally conducted is no longer required and a photographing operation with a proper exposure can be easily carried out.

Also, when the minimum light amount: required for ensuring the performance of the photometric detector 123 is the same as that for the conventional unit, a ratio of the light amount to be applied onto the photometric detector 123 with respect to the light amount to be applied onto the surface of the film 131 at the exposure is larger than that in the conventional unit so that photometry of a relatively weaker light can be conducted. As a result, it is possible to conduct the photometry with a higher reliability, together with the light shielding effect by the light shielding member 20, even when the sample 103 is dark.

Moreover, since the prism support member 12 is used as the light shielding member 20, a driving mechanism dedicated for inserting/retracting the light shielding member 20 into/from the optical path B of the observation system is not required. As a result, it is possible to provide the photographing unit for a microscope at a low cost.

Note that the foregoing embodiments were described by using prisms. However, the device to be used is not limited to prisms, but mirrors may be used instead.

If 100% of the light amount from the sample is directed to the photometric detector, an amount of the light to be applied onto the photometric detector may be larger than an amount of the light for ensuring the performance of the photometric detector. Therefore, if the photographing unit is arranged to have an additional prism which has a low ratio of light division toward the photometric optical path C so as to have three or more prisms in total, the additional prism which has a low ratio of light division toward the photometric optical path C can be inserted into the optical path when a light amount from the sample is too large. As a result, the photometric function can be adapted to a brighter sample.

Figure 23:
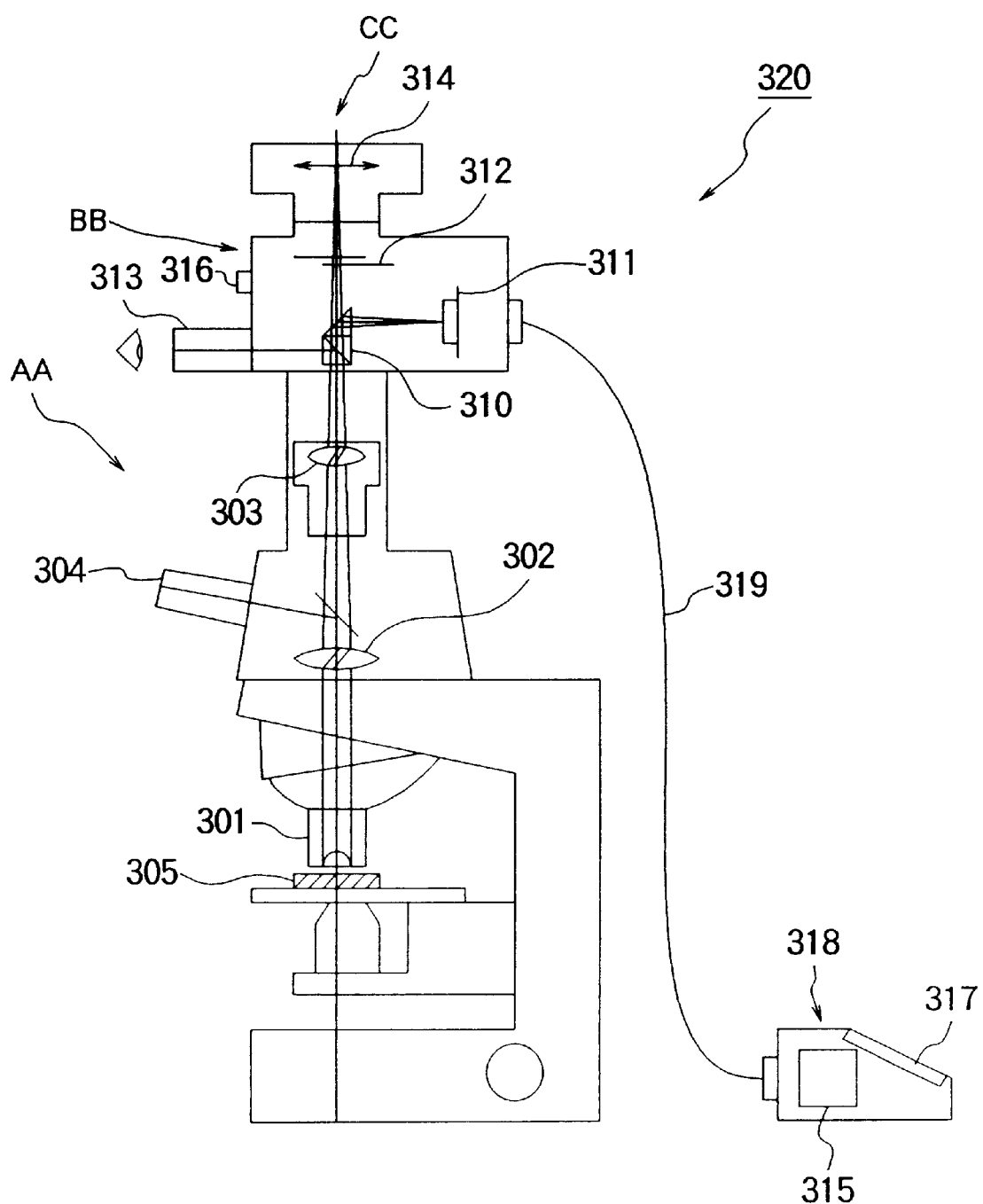
FIG. 23 is a view for showing an overall structure of a microscopic device which is provided with a camera for photographing for a microscope according to a fourth embodiment of the present invention.

FIG. 23 is a view for showing an overall structure of a microscopic device which is provided with a camera for photographing according to the fourth embodiment of the present invention.

A microscopic device 320 is comprised of a microscope main body AA, a photographing unit BB which is mounted on the microscope main body AA, and a camera box CC which is attached to the photographing unit BB. In the microscope main body AA, an image of a sample 305 is observed by an eyepiece barrel 304 through an objective lens 301 and an imaging lens 302. Also, light from the imaging lens 302 is guided to the photographing unit BB through a projection lens 303. An optical path changing-over prism 310 is provided in an optical path of the photographing unit BB. The light from the sample is divided by this prism 310 for a finder 313, a photometric detector 311, and the camera box CC. A shutter 312 is provided in an optical path toward the camera box CC. A control box 318 is connected to the photographing unit BB by a signal cable 319 so as to conduct reciprocal signal transmission therebetween.

A film 314 for photographing is loaded in the camera box CC. At the photographing time, the prism 310 is moved in a direction vertical to the sheet surface of FIG. 23 and is disposed at a position off an optical path of the microscope, and all of the light from the sample 315 is controlled to be directed to the film 314 in the camera box CC. An exposure time by the shutter 312 is determined by a photometric value of the photometric detector 311. At the photographing time, the photographing unit is controlled by a control unit 315 which is provided in the control box 318. In the control box 318, there is provided an operating member 317 for conducting an exposure correction, exposure operation, etc., at the photographing time.

In the photographing unit BB, there is provided a object detector 316 which detects the head portion of an observer when the observer looks in the finder. This object detector 316 is a sensor of a light reflection type which is comprised of a light source for emitting, for example, an infrared ray and a light receiving element for receiving a reflected light from an object such as a human body positioned in the vicinity of the photographing unit BB.

Figure 24:
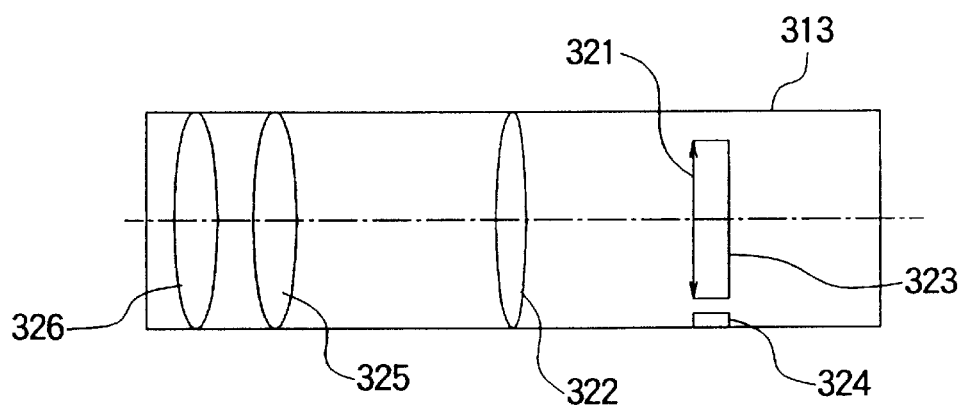
FIG. 24 is a view for showing an internal structure of a viewfinder 313.
Figure 25:
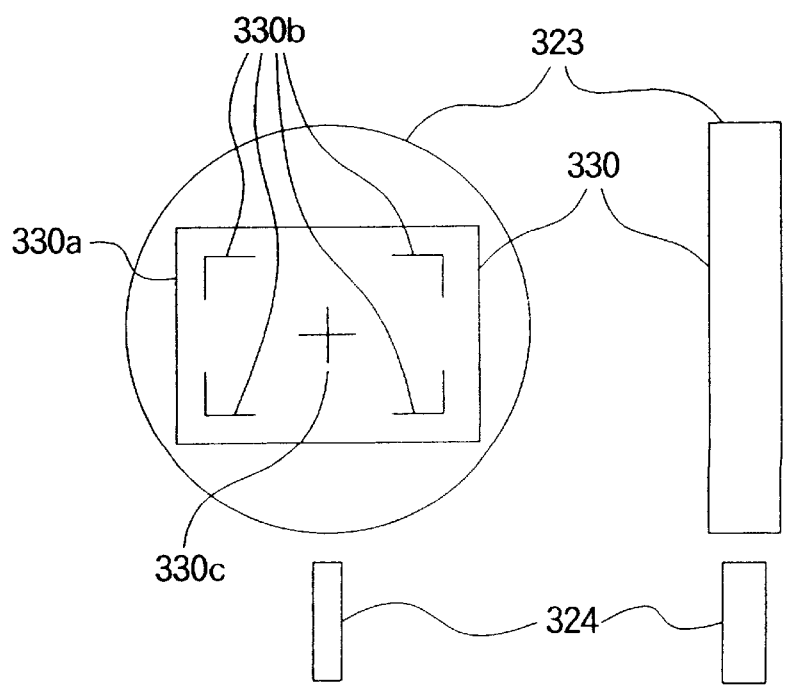
FIG. 25 is a view for showing a reticle and an illuminator for illuminating the reticle.

FIG. 24 is a view for showing the internal structure of the finder 313. FIG. 25 is a view for showing a reticle and an illuminator for illuminating the reticle. A sample image from the prism 310 in FIG. 23 is formed on an observation image plane 321 in the finder. A reticle 323 which is made of transparent glass with an index formed thereon is provided on this observation image plane 321. Light passing through the reticle 323 is observed by the observer through the lens 322 and the eyepiece systems 325 and 326. An illuminator 324 is provided below the reticle 323 for illuminating the reticle. As shown in FIG. 25, the illuminator 324 is provided with an unrepresented lamp which emits white light, and illuminates the reticle 323 from the side of the reticle 323. In this manner, the index 330 formed on the reticle is lighted so that this index can be observed from the finder together with an image of the sample. The index 330 in the present embodiment is comprised of a frame 330a for indicating a photographing range for a 35 mm camera, a frame 330b for indicating a photographing range for a large-sized camera, and cross lines 330c for indicating the center of the photographing range, as shown in FIG. 25.

Figure 26:
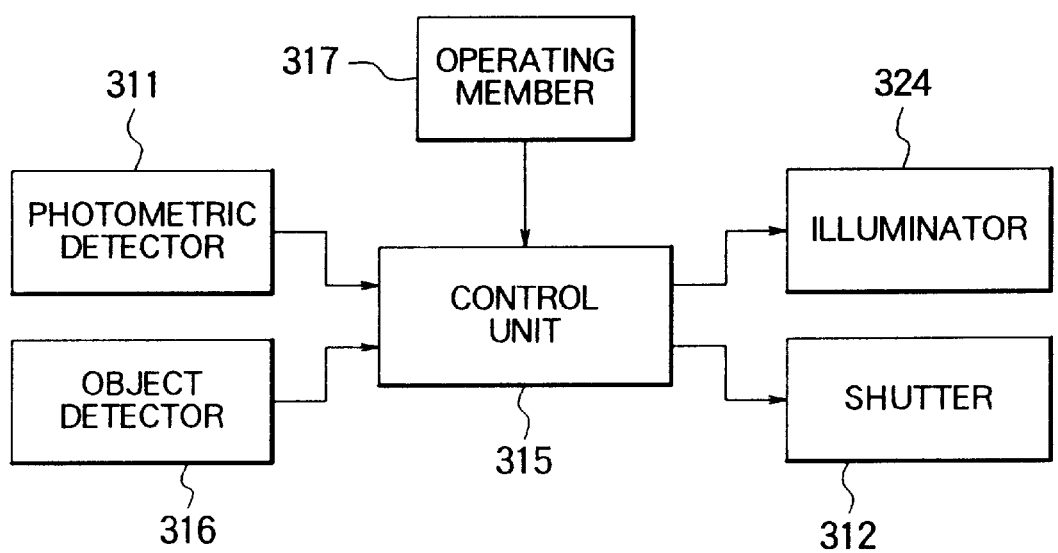
FIG. 26 is a block diagram for showing a schematic configuration of a control system according to the fourth embodiment.

FIG. 26 is a block diagram for showing a schematic configuration of a control system according to the fourth embodiment. As shown in FIG. 26, an operation signal which is sent from the operating member 317, a photometric value detection signal which is supplied from the photometric detector 311, and a detection signal from the object detector 316 are respectively supplied to the control unit 315 in the control box 318. The control unit 315 controls ON/OFF operations of the illuminator 324 for illuminating the reticle 323 and opening/closing of the shutter 312 based on these signals.

Figure 27:
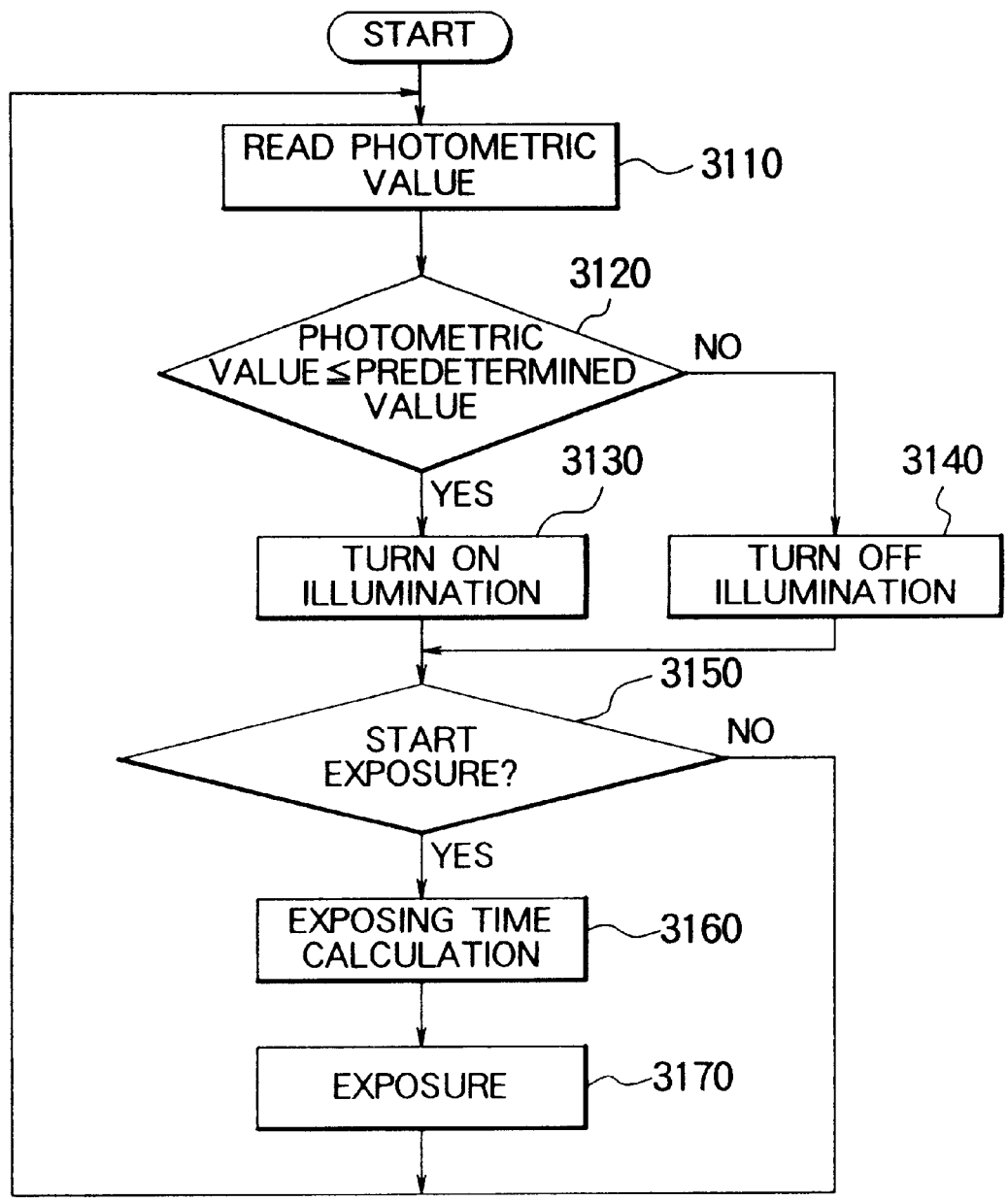
FIG. 27 is a flowchart for showing a control of an illuminator 324 and a shutter 312 by use of a control unit 315.
Figure 28:
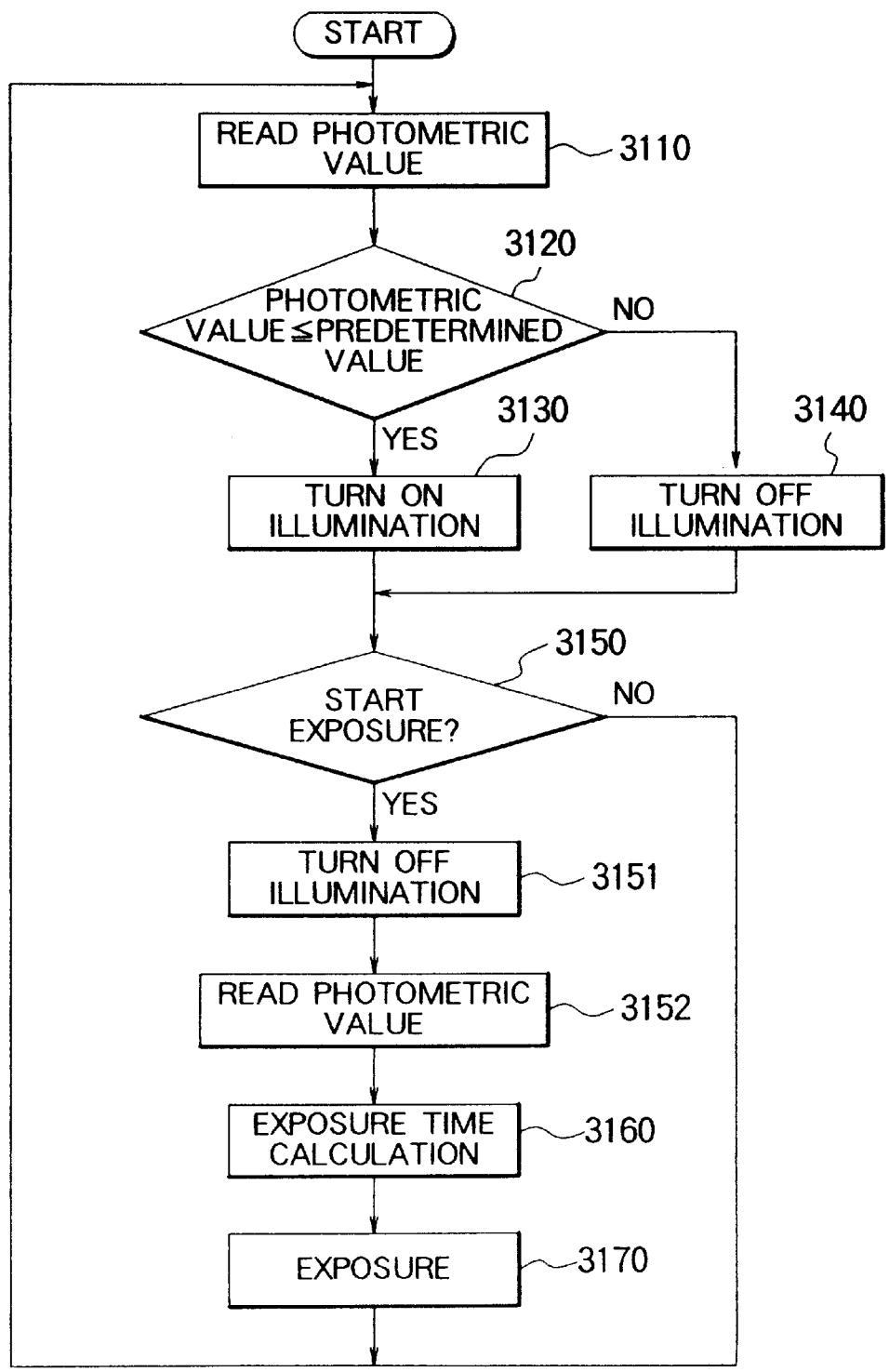
FIG. 28 is a first variation of the flowchart for control of the illuminator 324 and the shutter 312 by use of the control unit 315.
Figure 29:
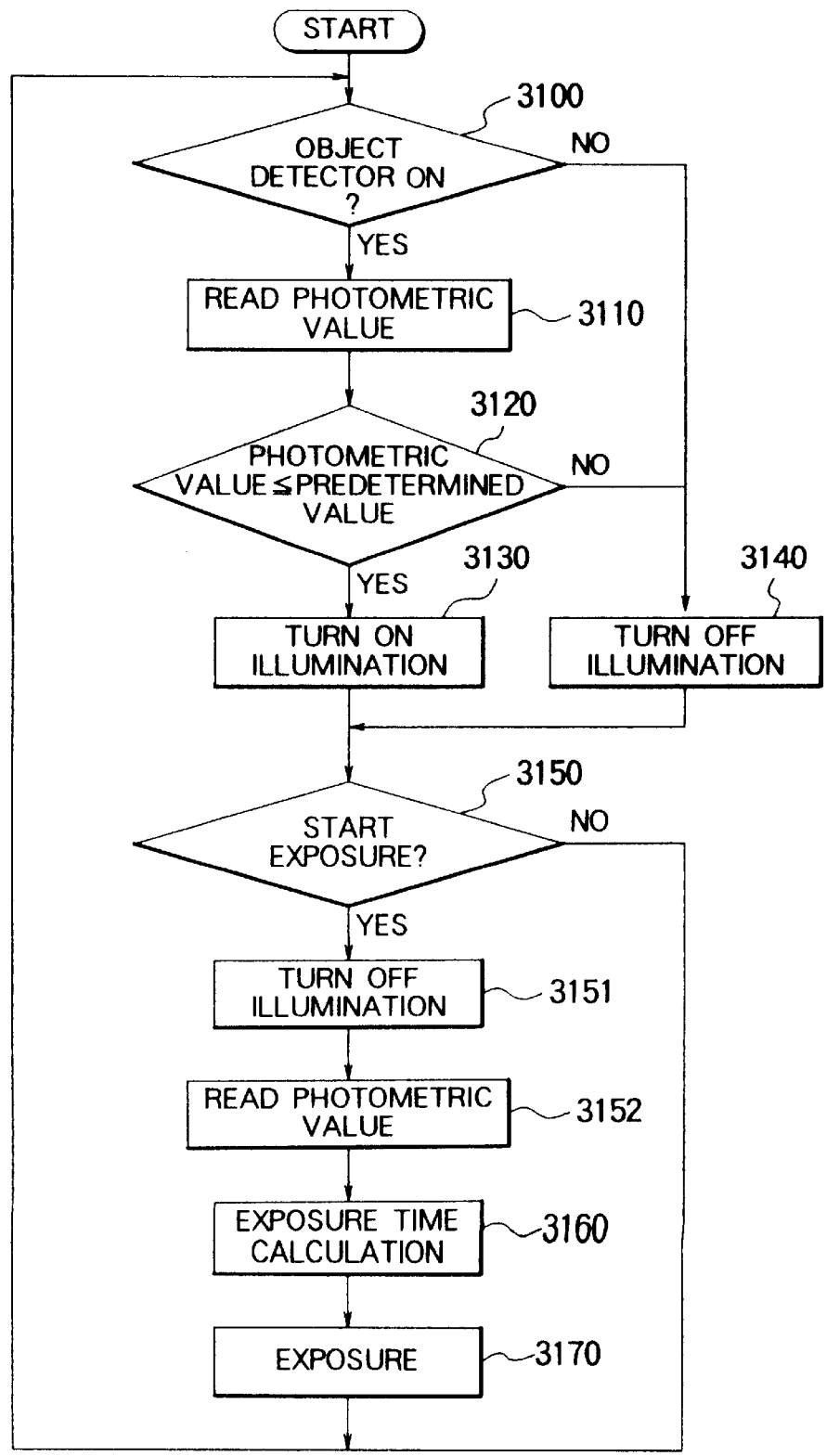
FIG. 29 is a second variation of the flowchart for control of the illuminator 324 and the shutter 312 by use of the control unit 315.

FIGS. 27 to 29 are flowcharts for control of the illuminator 324 and the shutter 312 by use of the control unit 315. Description will be made hereinafter with reference to FIGS. 27 to 29.

First, the control unit 315 receives a photometric value from the photometric detector 311 at: Step 3110, and judges whether the photometric value received at Step 3120 is smaller than or equal to a predetermined reference value or not. This reference value is stored in a memory device in the control unit 315 in advance. This reference value is set to discriminate between cases in which a light in the field of view is comparatively dark, such as an observation with a dark-field illumination, or an observation of a fluorescent sample and in which a light in the field of view is relatively bright, such as an observation with a bright-field illumination.

When the photometric value is smaller than the reference value at Step 3120, the control unit 315 advances to Step 3130 to turn on the illumination of the illuminator 324. In this case, if the illuminator has been already lit, this state is maintained. When the photometric value is larger than the reference value at Step 3120, the control unit 315 advances to Step 3140 to turn off the illumination of the illuminator 324. In this case, if the illuminator has been already turned off, this state is maintained.

When the on or off operation of the illuminator 324 at Step 3130 or Step 3140 is completed, the control unit 315 advances to Step 3150 to await a photographing operation from the operating member 317. The control unit 315 conducts the operations from Step 3110 to Step 3140 repeatedly until the photographing operation is started. In this case, the control unit 315 updates the photometric value supplied from the photometric detector 311 all the time. When a photographing start is instructed from the operating member 317, the control unit 315 advances to Step 3160, performs a calculation of an exposure based on a latest photometric value, and controls opening/closing of the shutter 312 based on the calculated value so as to conduct exposure of light from the sample 305 on the film 314. The control unit 315 is returned to Step 3110 upon completion of the exposure, so as to conduct the above-mentioned control all the time. This control is repeated until the light source of, for example, the control box or the photographing device BB is turned off.

As described above, it is possible to prevent a reticle illumination from being forgotten as lit or extinguished at the time of finder observation, by controlling lighting/extinguishing of the illuminator 324 for illuminating the reticle 323 based on a photometric value by the photometric detector 311.

Next, a first variation of the control of the illuminator 324 and the shutter 312 by the control unit 315 will be described with reference to the flowchart in FIG. 28. In FIG. 28, the same steps as those shown in FIG. 27 are given the same reference numerals, and description thereof will be omitted here. In this variation, Step 3151 for turning off the illumination and Step 3152 for reading a photometric value are added to the control steps shown in FIG. 27.

As shown in FIG. 28, when the photographing start is instructed from the operating member 317 at Step 3150, the control advances to Step 3151 to turn off the illumination of the illuminator 324. In this case, if the illuminator 315 has been extinguished, this state is maintained. After that, the control advances to Step 3152 to read the latest photometric value from the photometric detector 311 for the second time. Then, the control advances to Step 3160 to conduct an exposure calculation based on the photometric value which is read after the extinction of the illumination.

As described above, according to this variation, the illumination of the reticle is extinguished before the photographing operation without fail and then the exposure calculation is conducted by detecting the photometric value, so that an accurate exposure calculation can be conducted and the illumination light for illuminating the reticle does not reach the film to exert an influence on the photographing operation.

Next, a second variation of the control of the illuminator 324 and the shutter 312 by use of the control unit 315 will be described with reference to a flowchart in FIG. 29. In FIG. 29, the same steps as those shown in FIG. 28 are given the same reference numerals, and description thereof will be omitted here. In this second variation, Step 3100 for determining whether the object detector is on or off is added to the control steps shown in FIG. 28.

As shown in FIG. 29, a detection signal from the object detector 316 is read first before reading of the photometric value. When the object detector 316 does not detect the object (observer), that is, when the observer does not look in the finder 313, the control unit 315 advances to Step 3140 to turn off the illumination of the illuminator 324, irrespective of the photometric value. When the object detector 316 detects the object (observer), that is, the observer looks in the finder 313, the control unit 315 advances to Step 3110 to read the photometric value.

As described above, according to the second variation, since the illumination of the reticle is extinguished without fail when the observer does not look in the finder and when the exposing (photographing) operation is conducted, the reticle is not unnecessarily illuminated so that it is possible to conduct accurate exposure calculation and exposing (photographing) operation.

In the foregoing embodiments, the illuminator 324 is arranged to have the lamp for emitting white light. However, the present invention is not limited to this. The illuminator may be provided with light sources of arbitrary colors to change the kind of light source in accordance with an object to be observed. Also, the control box 318 may be integrally formed with the photographing unit BB. Moreover, the control unit 315 may advance to Step 3110, after receiving detection signals from the object detector 316 for a predetermined continuous time (e.g., 1 second) at Step 3100. In this manner, an erroneous detection of the observer can be prevented.

Figure 30:
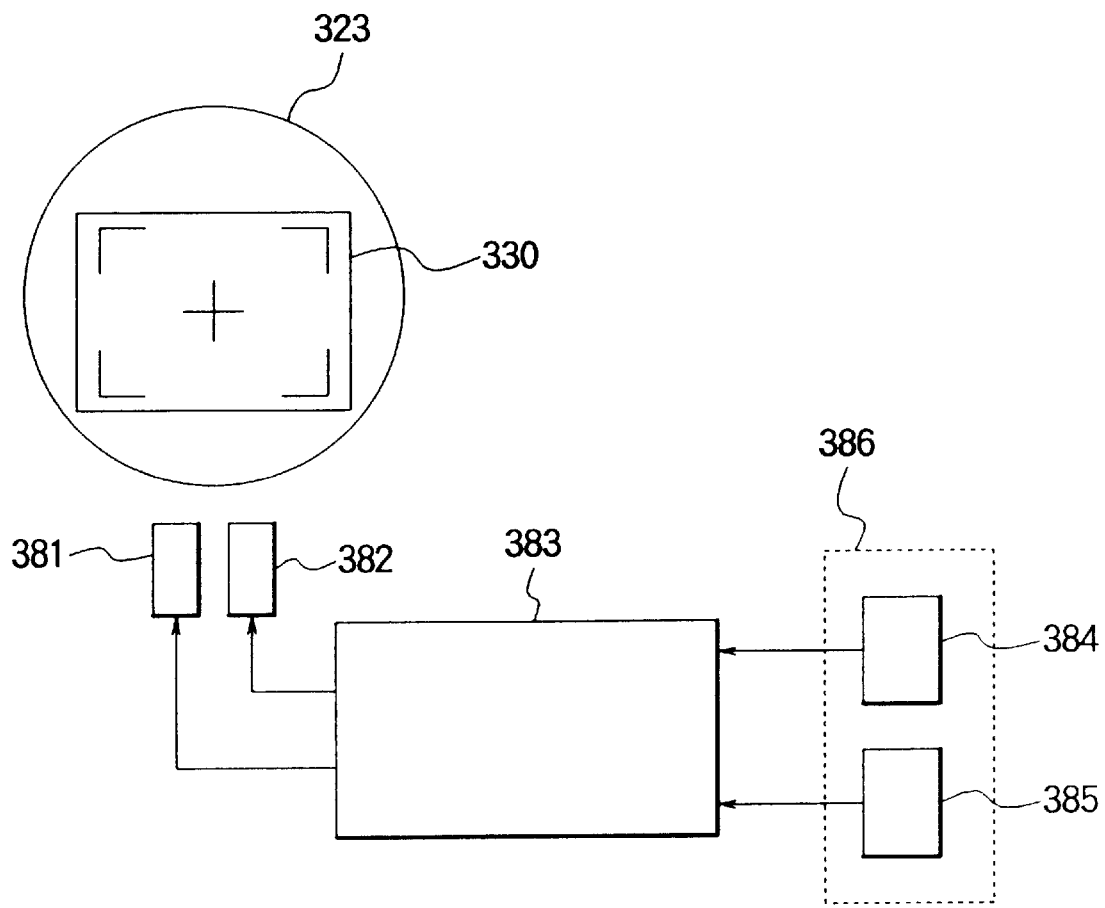
FIG. 30 is a view for showing a schematic configuration of a fifth embodiment of the present invention.

Next, the fifth embodiment of the present invention will be described. The fifth embodiment is different from the foregoing fourth embodiment in that the photometric detector 311 is a color sensor, and the illuminator 324 is an illumination device which has a plurality of light sources for emitting different colors (wavelengths). The other arrangements are the same as those in the fourth embodiment. The fifth embodiment will be described below with reference to FIG. 30. Illustration and description of the identical components to those in the fourth embodiment will be omitted.

The color sensor 386 which serves as the photometric detector comprises a first sensor 384 which has the peak of detection sensitivity in the wavelength range of red, and a second sensor 385 which has the peak of detection sensitivity in the wavelength range of blue. Light from the sample is measured by these sensors 384 and 385, and detection signals therefrom are sent to the control unit 383. The two sensors 384 and 385 are calibrated in advance to have the same output level when detecting a colorless light. Since wavelength ranges to be detected by the two sensors 384 and 385 are different from each other, there arises a difference between the intensities of detection signals therefrom depending on a wavelength (color) of the light from the sample. The control unit 383 controls illumination and extinction of a first light source 381 for emitting a wavelength of red light and a second light source 382 for emitting a wavelength of blue light, in accordance with the difference between the intensities of the detection signals from the sensors. The control unit 383 in the fifth embodiment also receives signals from the object detector 316 and the operating member 317, as shown in FIG. 26, and outputs a control signal to the shutter 312, illustration of which, however, is omitted.

Figure 31:
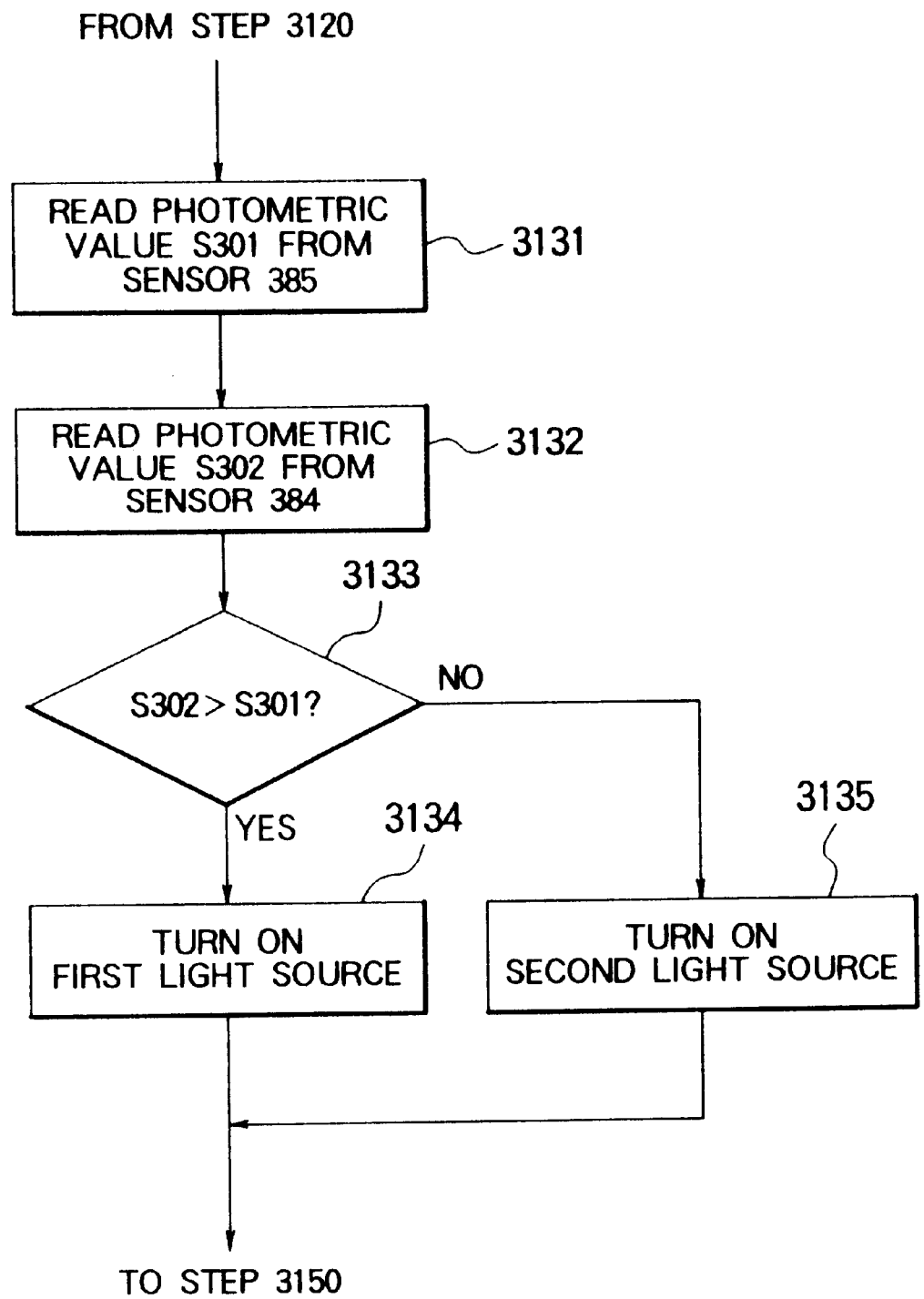
FIG. 31 is a flowchart according to the fifth embodiment of the present invention.

The flowchart in FIG. 31 shows a control of the illumination and extinction of the first light source 381 and the second light source 382 by the control unit 383. The control flow in this embodiment is different only a step at Step 3130 shown in FIG. 27 (or FIG. 28 or 29), so that illustration and description of the other steps will be omitted.

When a photometric value by the color sensor 386 is judged to be smaller than a predetermined reference value at Step 3120, the control unit 383 receives a photometric value S301 from the sensor 384 at Step 3131 and a photometric value S302 from the sensor 385 at Step 3132.

Next, the photometric values S301 and S302 from the sensors 384 and 385 are compared with each other at Step 3133. When the photometric value S301 is smaller than the photometric value S302, which means a light from the sample has a color akin to blue, the control advances to Step 3134 so as to turn on the first light source 381 which emits red light. In this case, when the second light source 382 has been already lit, this second light source 382 is turned off. When the photometric value S301 is not smaller than the photometric value S302, which means the light from the sample has a color akin to red, the control advances to Step 3135 so as to turn on the second light source 382 which emits blue light. In this case, when the first light source 381 has been already lit, this first light source 381 is turned off. Upon completion of the step at Step 3134 or 3135, the control unit 3150 advances to Step 3150 to wait until a photographing is instructed.

In the embodiments as described above, the control unit controls the illuminator in such manner that the reticle is illuminated with a color different from the color of the light from the sample, so that the index of the reticle is always indicated in a distinguishable color.

In the present embodiment, the illuminator carries out illumination with red and blue lights. However, another light source for emitting another different color may be added. Also, both of the light sources of red and blue lights may be lit to illuminate the reticle with an illumination light of magenta. Also, a plurality of color filters which transmit light having different wavelength ranges may be provided in a replaceable manner on the exit side of the light of the light source for emitting white light so as to change a kind of the color filter in accordance with the color of the light from the sample. Further, the control unit 383 calculates the wavelength of light from the sample in accordance with a difference between the intensities of detection signals from the sensors 384 and 385, and selects the light source which emits light having a wavelength remotest from (most separated from) the wavelength of the light from the sample, so as to light the reticle.

Also, in the above-mentioned fourth and fifth embodiments, a step for adjusting a light amount of the illumination light may be added, immediately after the step for putting on the illumination (Step 3130). At this step, the control unit 315 (or 383) controls a brightness of the illumination light of the illuminator 324 (or the light sources 381, 382) so that a contrast with respect to the background of the index of the reticle is appropriate, based on a signal from the photometric detector 311.

Figure 32:
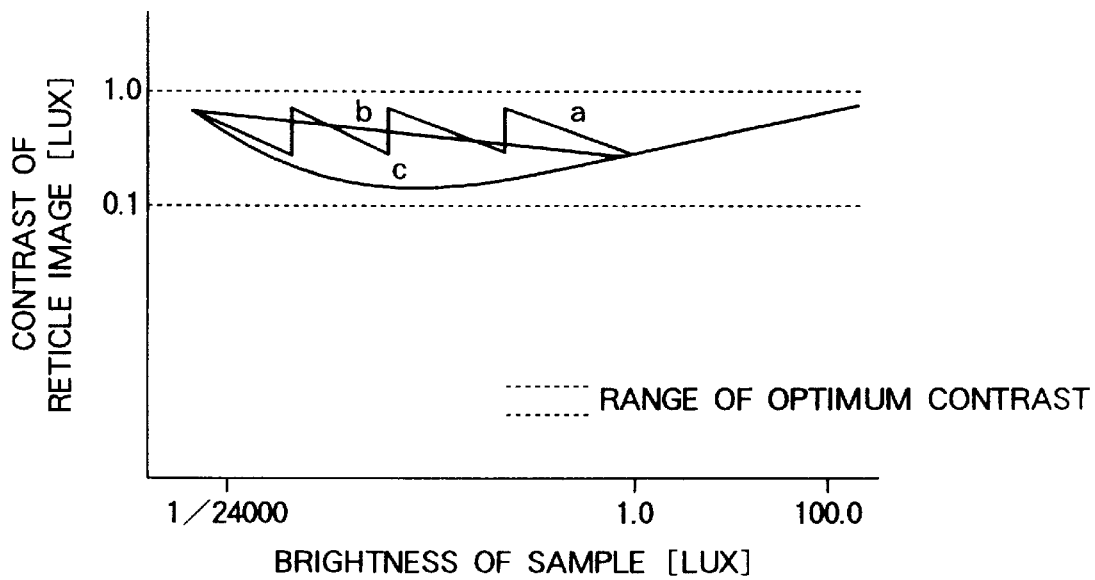
FIG. 32 is a view for showing a relationship between a contrast of a reticle index and a brightness of a sample.

FIG. 32 shows a relationship between a contrast of an index of a reticle to be controlled with respect to the background thereof and a brightness of the sample. Also, in order to obtain an index having the optimal contrast, the control method can employ a plurality of inclinations (a, b, and c), as shown in FIG. 33, so as to select one inclination in accordance with a kind of the sample.

Figure 33:
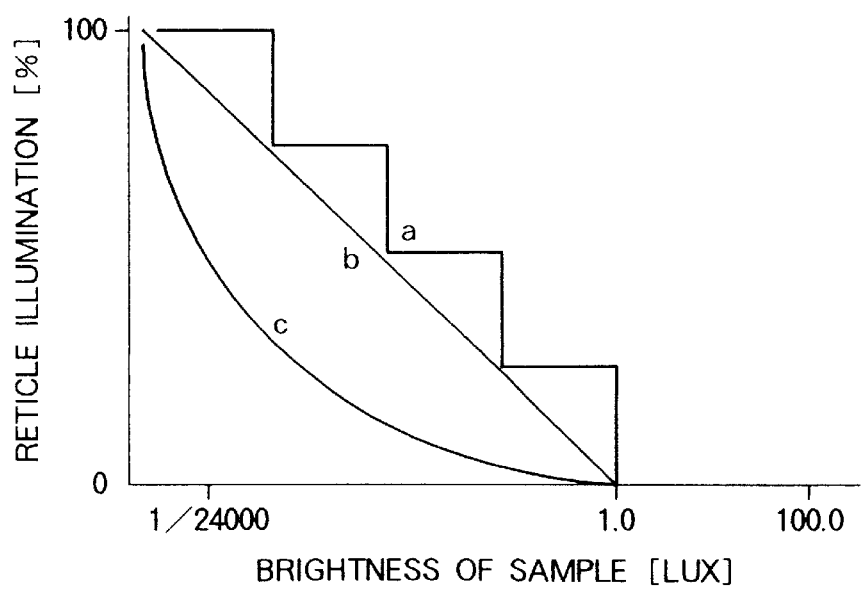
FIG. 33 is a view for showing a relationship between a reticle illumination and a brightness of the sample.

The control unit stores in advance data related to a degree of the reticle illumination with respect to a brightness of the sample, as shown in FIG. 33. This data is set in such a manner that a contrast of the index with respect to the background, i.e., an absolute value of difference between the brightness of the index and the brightness of the sample, comes within a predetermined range (preferably from 0.1 to 1 [Lux] or around), as shown in FIG. 32. The control unit controls the illuminator based on a signal from the photometric detector and this data.

As described above, according to the photographing unit for a microscope of the present invention, it is possible to make an amount of light divided to the optical path of the observation system to be small when the light amount from the microscope is large and to make the amount of the light divided to the optical path of the observation system to be large when the light amount from the microscope is small. As a result, the finder observation can be conducted with a light amount which is more appropriate than that in the conventional unit.

According to the photographing unit for a microscope of the present invention, a prism which divides a small amount of light to the optical path of the observation system when the light amount from the microscope is large is used, so that it is possible to make an image of a dark sample to be bright and suppress the glare of a bright sample.

According to the photographing unit for a microscope of the present invention, the prism which has a high ratio of division of light amount toward the photometric detector enters the optical path when the photographer does not look in the finder, so that it becomes possible to apply a larger amount of the light onto the photometric detector, thereby carrying out a photometry with a high accuracy.

According to the photographing unit for a microscope of the present invention, it is possible to make a light amount to the optical path of the observation system to be small when the light amount from the microscope is large, and to make a light amount to the optical path of the observation system to be large when the light amount from the microscope is small. As a result, it is possible to conduct the finder observation with a light amount which is more appropriate than that in the conventional unit.

Further, according to the photographing unit for a microscope of the present invention, the troublesome cap removing operation which is conventionally required for each frame of the film is no longer necessary so that an accurate photometry of a sample can be conducted without an influence of an external light which enters through the optical path of the observation system into the microscope and, at the same time, a photographing operation can be conducted with a proper exposure.

According to the photographing unit for a microscope of the present invention, when the minimum light amount required for ensuring the performance of the photometric detector is the same as that in the conventional unit, a ratio of an amount of the light to be applied onto the photometric detector with respect to an amount of the light to be applied onto a film surface during exposure is higher than that in the conventional unit, so that a photometry can be conducted also with a relatively weaker light. As a result, it becomes possible to conduct the photometry with a high reliability, together with the light shielding effect by the light shielding member, even when a dark sample is used.

According to the present invention, a driving mechanism dedicated for inserting/retracting the light shielding member into/from the observation optical path is no longer required so that a photographing unit for a microscope into which the light shielding member is incorporated can be provided at a low cost.

In addition, according to the present invention, it is possible to avoid a troublesome operation for putting on or off the illumination of the index member, so that it is possible to prevent the illumination from being forgotten as lit or extinguished.

According to the present invention, when a photometry is conducted by the photometric detector, an accurate exposure calculation can be performed without an influence of a stray light of the illumination light from the illumination means of a reticle.

According to the present invention, the illumination of the index member can be turned on only when the microscope observer looks in the finder. As a result, it is possible to prevent unnecessary illumination.

According to the present invention, the control unit controls the illuminator in such a manner that the index member is illuminated with a color which is different from that of a light from the sample. As a result, the index is all the time displayed in a distinguishable color from the color of the light from the sample.

What is claimed is:

1. A photographing unit for a microscope comprising:
   a photometric member which measures a brightness of light from a sample;
   a changing member to receive light from the sample and which changes a brightness of light from the sample toward an observation system; and
   a control unit which controls the brightness of the light from the sample toward the observation system allowed by said changing member, based on a detection output of said photometric member.

2. A photographing unit according to claim 1, wherein said changing member comprises a plurality of light-dividing members having different ratios of light division, and said control unit selects one of said plurality of light-dividing members based on the detection output of said photometric member and inserts the selected light-dividing member into an optical path of said observation system.

3. A photographing unit according to claim 2, further comprising:
   an object detector which detects an approach of an object to said optical path of said observation system,
   wherein said control unit judges which light-dividing member is to be selected based on detection outputs of said object detector and said photometric member.

4. A photographing unit according to claim 1, wherein said changing device comprises an attenuation filter, and said control unit controls insertion/retraction of said attenuation filter into/from an optical path of said observation system based on the detection output of said photometric member.

5. A photographing unit for a microscope provided with an optical path of an observation system, comprising:
   a light amount changing member to receive light from a sample and which changes an amount of light from the sample toward said optical path of the observation system;
   a sensor which detects one of an amount of light from the sample and an approach of an object toward said optical path of the observation system; and
   a control unit which controls the amount of the light toward said optical path of the observation system allowed by said light amount changing member, based on a detection output of said sensor.

6. A photographing unit for a microscope comprising:
   a photometric member which measures a brightness of light from a sample;
   a changing member which changes a brightness of light from the sample toward an observation system;

said photometric member and said changing member being housed by a housing which is constructed to mount to a microscope barrel portion; and a control unit which controls the brightness of the light from the sample toward the observation system allowed by said changing member, based on a detection output of said photometric member.

7. A photographing unit according to claim 6, wherein said changing member comprises a plurality of light-dividing members having different ratios of light division, and said control unit selects one of said plurality of light-dividing members based on the detection output of said photometric member and inserts the selected light-dividing member into an optical path of said observation system.

8. A photographing unit according to claim 7, wherein said light-dividing members comprise prisms.

9. A photographing unit according to claim 7, further comprising:

an object detector which detects an approach of an object to said optical path of said observation system, wherein said control unit judges which light-dividing member is to be selected based on detection outputs of said object detector and said photometric member.

10. A photographing unit according to claim 6, wherein said changing device comprises an attenuation filter, and said control unit controls insertion/retraction of said attenuation filter into/from an optical path of said observation system based on the detection output of said photometric member.

11. A photographing unit for a microscope provided with an optical path of an observation system, comprising:

a light amount changing member which changes an amount of light from a sample toward said optical path of the observation system;

a sensor which detects one of an amount of light from the sample and an approach of an object toward said optical path of the observation system;

said light amount changing member and said sensor being housed by a housing constructed to mount to a microscope barrel portion; and a control unit which controls the amount of the light toward said optical path of the observation system allowed by said light amount changing member, based on a detection output of said sensor.

12. A photographing unit according to claim 2, wherein said light-dividing members comprise prisms.

* * * * *